US011484121B1

(12) United States Patent
Cornell et al.

(10) Patent No.: US 11,484,121 B1
(45) Date of Patent: Nov. 1, 2022

(54) MODULAR CABINET SYSTEM

(71) Applicant: Richard D. Cornell, Knoxville, TN (US)

(72) Inventors: Richard D. Cornell, Knoxville, TN (US); Benjamin D. Nibali, Maryville, TN (US); Kristo Kukk, Knoxville, TN (US)

(73) Assignee: Richard D. Cornell, Knoxville, TN (US)

( * ) Notice: Subject to any disclaimer, the term of this patent is extended or adjusted under 35 U.S.C. 154(b) by 0 days.

(21) Appl. No.: 17/710,061

(22) Filed: Mar. 31, 2022

Related U.S. Application Data

(60) Provisional application No. 63/188,768, filed on May 14, 2021.

(51) Int. Cl.
*A47B 87/00* (2006.01)
*A47B 77/02* (2006.01)
*B60B 33/00* (2006.01)

(52) U.S. Cl.
CPC ............ *A47B 87/007* (2013.01); *A47B 77/02* (2013.01); *B60B 33/0002* (2013.01)

(58) Field of Classification Search
CPC ..... A47B 88/41; A47B 88/413; A47B 87/007; A47B 77/02; A47B 2210/0016; B60B 33/0002
See application file for complete search history.

(56) References Cited

U.S. PATENT DOCUMENTS

| | | | | |
|---|---|---|---|---|
| 4,026,616 A | * | 5/1977 | Kuehl | A47B 77/02 312/278 |
| 4,861,122 A | * | 8/1989 | Newhouse | B25H 3/06 384/23 |
| 5,046,790 A | * | 9/1991 | Onomoto | A47B 96/00 312/351.13 |
| 6,371,584 B1 | * | 4/2002 | Alreck | A47B 88/457 177/144 |
| 2007/0284981 A1 | * | 12/2007 | Cheng | H05K 7/1494 312/334.1 |
| 2017/0151913 A1 | * | 6/2017 | Granzotto | A47B 88/41 |

* cited by examiner

*Primary Examiner* — Matthew W Ing
(74) *Attorney, Agent, or Firm* — Pitts & Lake, P.C.

(57) ABSTRACT

A modular cabinet system including a cabinet shell configured with an open front space, a cabinet insert configured to be selectively installed in, and removed from, the cabinet shell by being passed through the open front space, a pair of first slide members respectively provided to each inner side surface of the cabinet shell, and a pair of second slide members respectively provided to each outer side surfaces provided proximate each side of the cabinet insert, wherein the respective first slide members are configured to interact with the corresponding second slide members to guide the cabinet insert into, and out of, the cabinet shell.

19 Claims, 33 Drawing Sheets

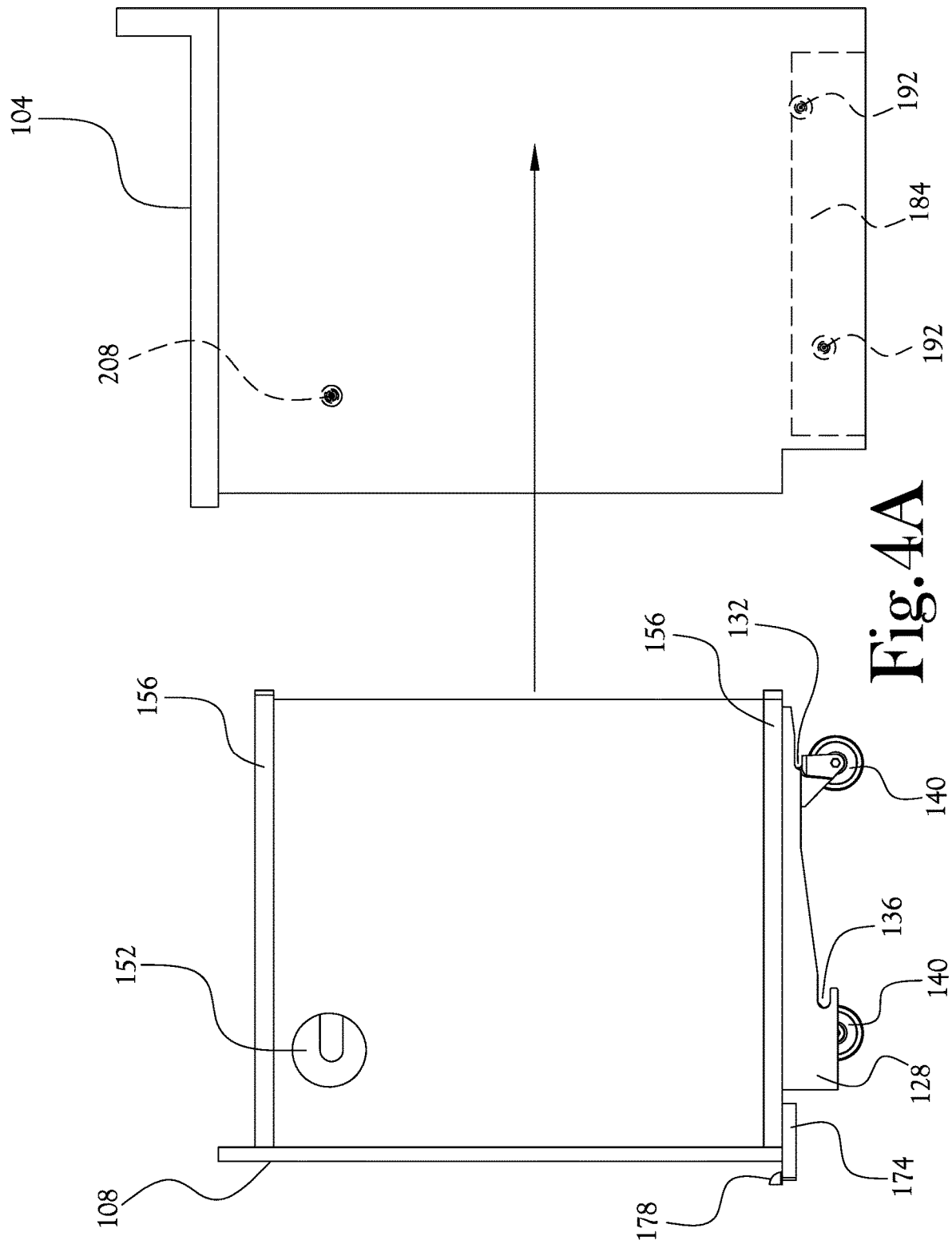

MODULAR CABINET SYSTEM

CROSS-REFERENCE TO RELATED APPLICATIONS

This application claims the benefit of United States Provisional Patent Application Ser. No. 63/188,768, filed on May 14, 2021, which is incorporated herein in its entirety by reference.

FIELD OF INVENTION

The present general inventive concept relates to cabinetry, and, more particularly, to a modular cabinetry system that allows convenient changing of a cabinet insert in a cabinet shell.

BACKGROUND

Cabinetry is one of the most important features of a home, and often commercial or industrial spaces, because of the unique combination of aesthetic and utilitarian features. Cabinets often provide a central decorative theme in residential kitchens, and can provide a host of different storage options such as drawers, shelves, racks, and so on. However, given the expense and permanent nature of conventional cabinets, a user is typically constrained to whatever cabinet features are initially installed, unless that user wants to undergo an expensive remodel process. The same is typically true when it comes to damage to the cabinetry, as repairs to various items can become very expensive and burdensome. In situations in which an owner of a residence will have different people moving in after lease periods and the like, damages may be routinely encountered, or special features may be desired for disabled persons, etc. Thus, especially in the case of residential units in which tenants move in and out periodically, such as vacation rental homes, apartment complexes, assisted living facilities, and so on, it would be desirable to be able to quickly and conveniently change out various elements of the cabinetry for providing different features and elements, to make repairs or maintenance, or to replace various damaged components of the cabinetry. This would be of significant value to, for example, the hospitality industry, i.e., hotels, motels, and extended stay lodgings wherein the quick repair and/or replacement of such items would greatly reduce the out-of-service time for the rooms/suites being repaired and/or refurbished.

BRIEF SUMMARY

According to various example embodiments of the present general inventive concept, a modular cabinet system is provided that includes one or more cabinet shell spaces and one or more cabinet insert units such that the cabinet insert units may be quickly and conveniently inserted into, and removed from, the cabinet shell spaces. The exchange or replacement with same or different cabinet insert units may be performed without additional tools in many example embodiments.

Additional aspects and advantages of the present general inventive concept will be set forth in part in the description which follows, and, in part, will be obvious from the description, or may be learned by practice of the present general inventive concept.

The foregoing and/or other aspects and advantages of the present general inventive concept may be achieved by providing a modular cabinet system including a cabinet shell configured with an open front space, a cabinet insert configured to be selectively installed in, and removed from, the cabinet shell by being passed through the open front space, a pair of first slide members respectively provided to each inner side surface of the cabinet shell, and a pair of second slide members respectively provided to each outer side surfaces provided proximate each side of the cabinet insert, wherein the respective first slide members are configured to interact with the corresponding second slide members to guide the cabinet insert into, and out of, the cabinet shell.

The foregoing and/or other aspects and advantages of the present general inventive concept may also be achieved by providing a system to allow a modular cabinet insert to be selectively installed in and removed from a cabinet shell, the system including a pair of first slide members configured to be connected to a cabinet shell having an open front space, and a pair of second slide members configured to be connected to a modular cabinet insert configured to pass through the open front space of the cabinet shell, wherein the respective first slide members are configured to interact with the corresponding second slide members to guide the modular cabinet insert into, and out of, the cabinet shell through the open front space.

Other features and aspects may be apparent from the following detailed description, the drawings, and the claims.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which:

FIGS. 4A-D illustrate the operations of installing the cabinet inserts into the cabinet shells of FIGS. 1A-B;

DETAILED DESCRIPTION

Reference will now be made to the example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be simplified and/or omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

According to various example embodiments of the present general inventive concept, a modular cabinet system is provided that includes one or more cabinet shell spaces and one or more cabinet insert units such that the cabinet insert units may be quickly and conveniently inserted into, and removed from, the cabinet shell spaces. The exchange or replacement with same or different cabinet insert units may be performed without additional tools in many example embodiments. Thus, in various example embodiments a user can simply roll the desired modular cabinet insert, which may include any of a number of different features such as drawers, shelves, etc., to the cabinet shell and slide the cabinet insert inside. Some example embodiments may also allow the cabinet insert to be locked or secured into place to ensure that the cabinet insert does not move or become dislodged from the cabinet shell.

Figure 1A:
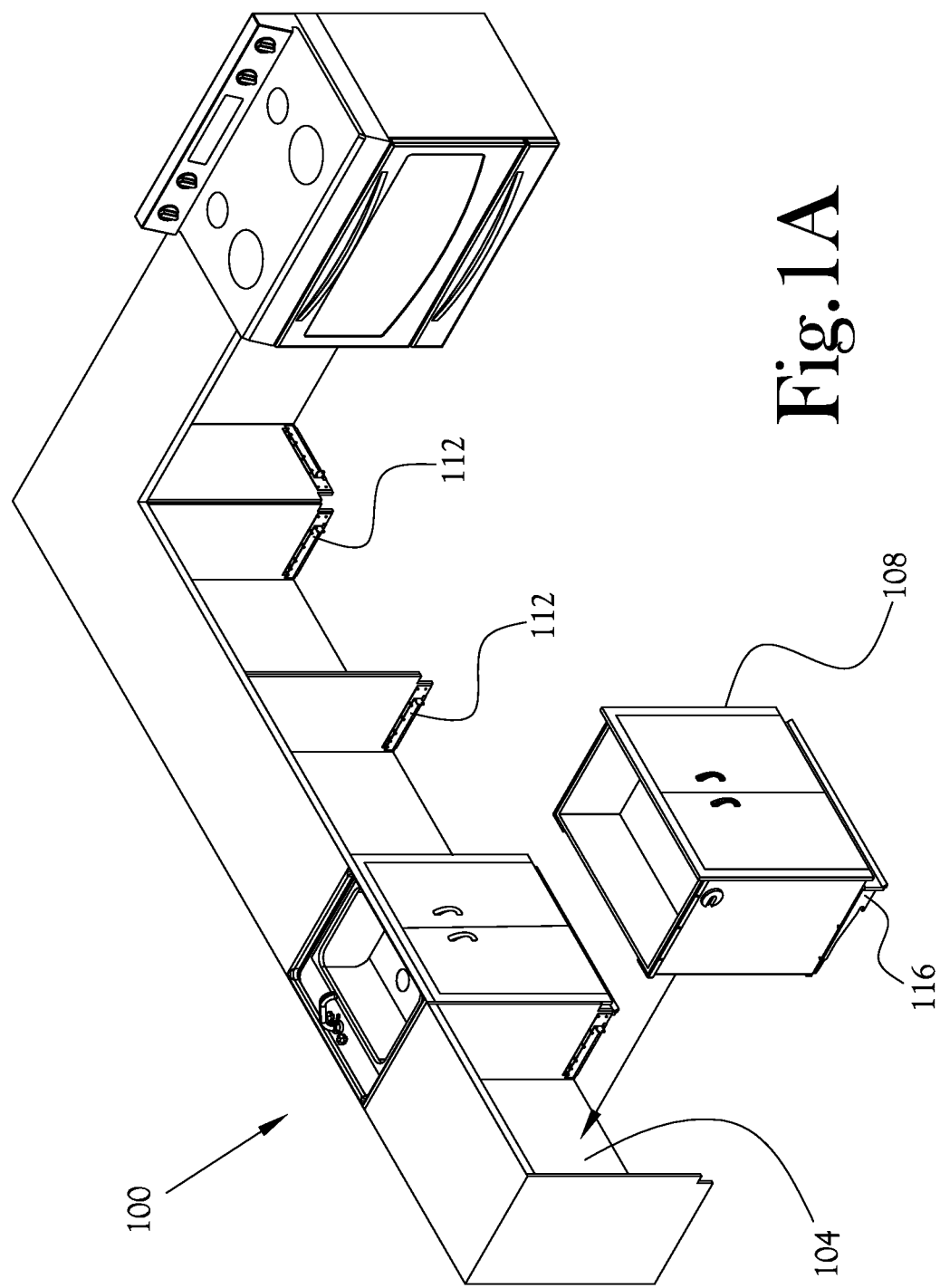
FIGS. 1A-B illustrate a modular cabinet system according to an example embodiment of the present general inventive concept.
Figure 1B:
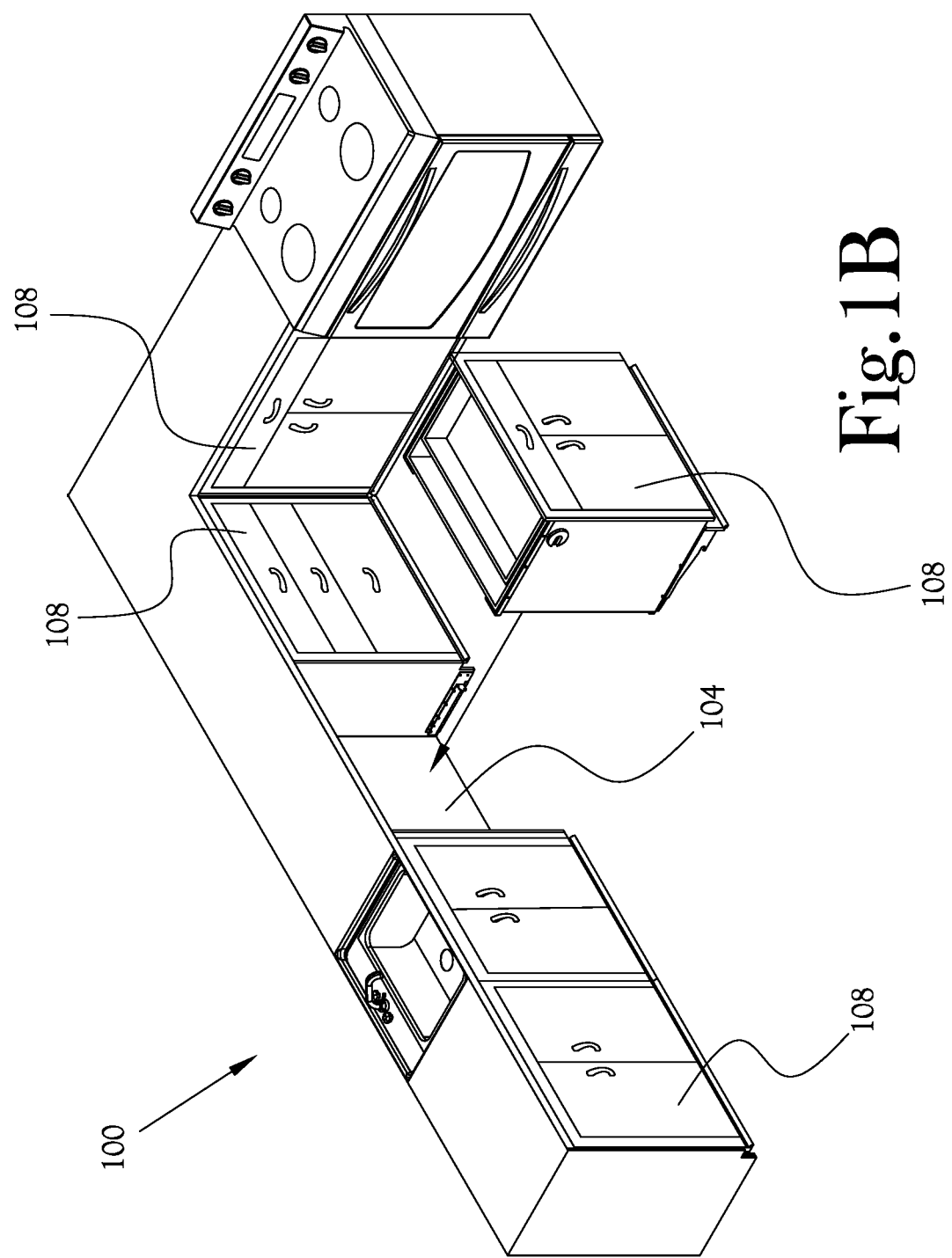

FIGS. 1A-B illustrate a modular cabinet system according to an example embodiment of the present general inventive concept. As illustrated in FIGS. 1A-B, the modular cabinet system 100 provides a number of different cabinet spaces or cabinet shells 104 that are configured such that any one of a number of different modular cabinet inserts 108 may be inserted into the cabinet shell 104 to customize the cabinetry for the desired features. While the cabinet insert 108 illustrated in FIG. 1A is shown with doors that open to one or more shelves oriented inside, it is understood that a number of differently designed and/or functioning features may be provided in the cabinet insert 108. Each cabinet shell 104 is provided with a slide or slide assembly, referred to herein as a first slide member 112, and each modular cabinet insert 108 is provided with a slide or slide assembly referred to herein as a second slide member 116. The first slide members 112 and second slide members 116 are configured to interact to guide the cabinet inserts 108 into the respective cabinet shells 104, and various example embodiments of these slide members will be described in more detail herein. In various example embodiments the first and second slide members 112, 116 may be designed to lift the cabinet inserts off the floor at least slightly when the modular cabinet insert is fully slid in to be fully mounted or installed, to account for imperfections in the level of the floor space under the cabinet insert. Various example embodiments of the present general inventive concept may provide rolling members such as caster wheels on the bottom of the cabinet inserts to make them even more conveniently mobile, such that a user can easily move the rolling cabinet insert by oneself. In the example embodiment illustrated in FIGS. 1A-B, the first slide members 112 are arranged near the bottom of each side of the cabinet shell 104, and the second slide members 116 are arranged proximate the bottom of each side of the cabinet insert, for easy access to the first and second slide members 112, 116 through a toe kick panel space due to the toe kick panel being movable, or removable, especially when the first and second slide members 112, 116 have coupling or securing components to secure the cabinet insert 108 in the cabinet shell 104. However, in various other example embodiments the first and second slide members may be located at various other locations, and with various other arrangements, in the cabinet shell and on the cabinet insert to aid in the installation of the modular cabinet inserts. FIG. 1B illustrates one possible arrangement of a plurality of modular cabinet inserts 108, in which some of the cabinet inserts 108 have cabinet doors, one of the cabinet inserts 108 has a plurality of drawers, and some of the cabinet inserts 108 have a drawer and doors combination. It is understood that a host of other configurations may be employed without departing from the scope of the present general inventive concept. The modular cabinet inserts 108 of FIG. 1B could be interchanged, as any of them would fit in any of the cabinet shells 104. Typically, cabinetry making up the corners or under-sink areas may not be part of the modular system, though differently configured modular under-sink modular inserts may be implemented according to various example embodiments of the present general inventive concept. In the descriptions herein, a single cabinet shell 104 and cabinet insert 108 may be referred to as the modular cabinet system 100, but it is understood that such a system may refer to a plurality of cabinet shells 104, as illustrated in FIGS. 1A-B, as well as a plurality of similar and/or differently configured modular cabinet inserts 108.

Figure 2A:
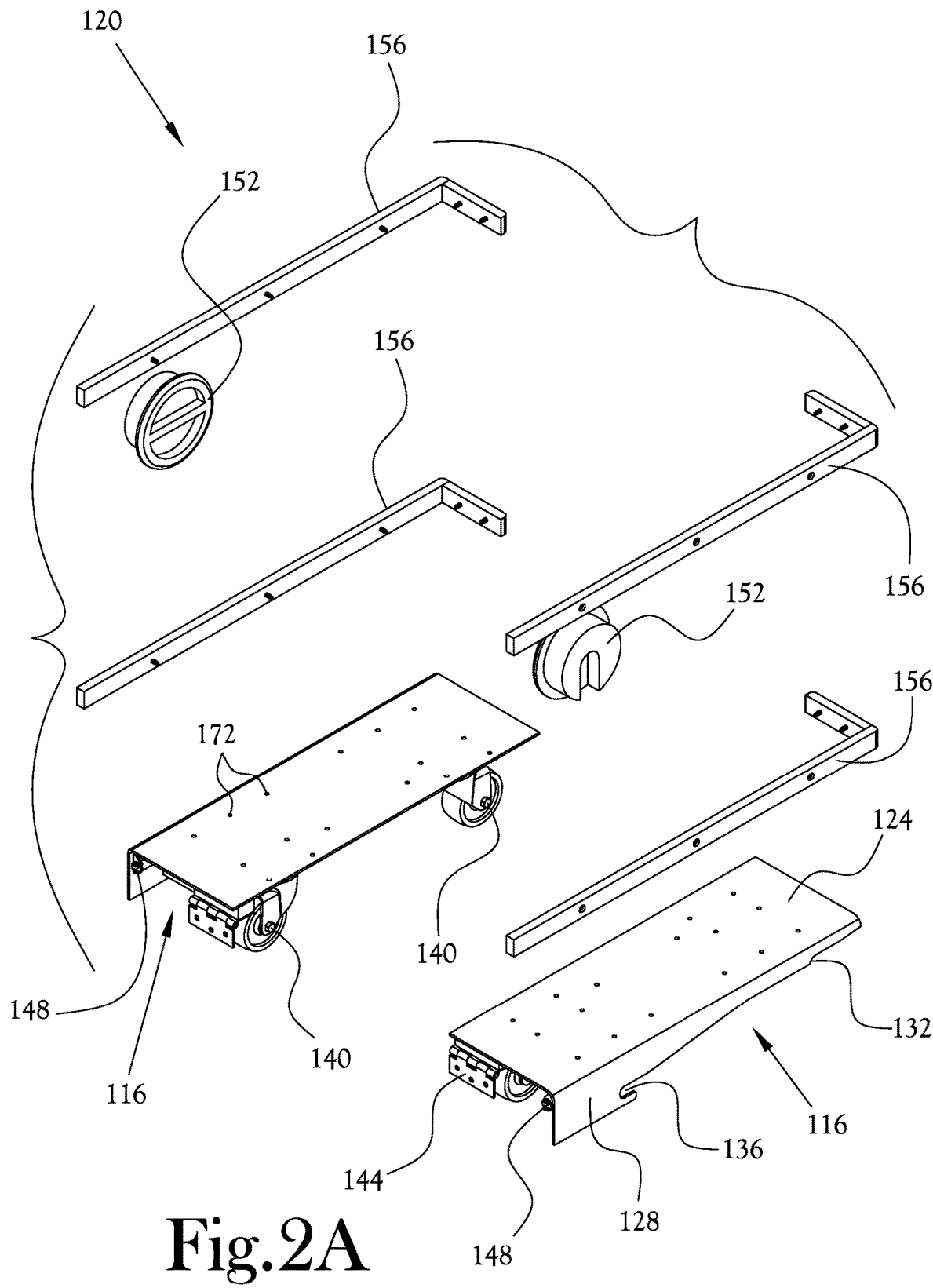
FIGS. 2A-E illustrate the cabinet insert system provided to the cabinet inserts of FIGS. 1A-B.
Figure 2B:
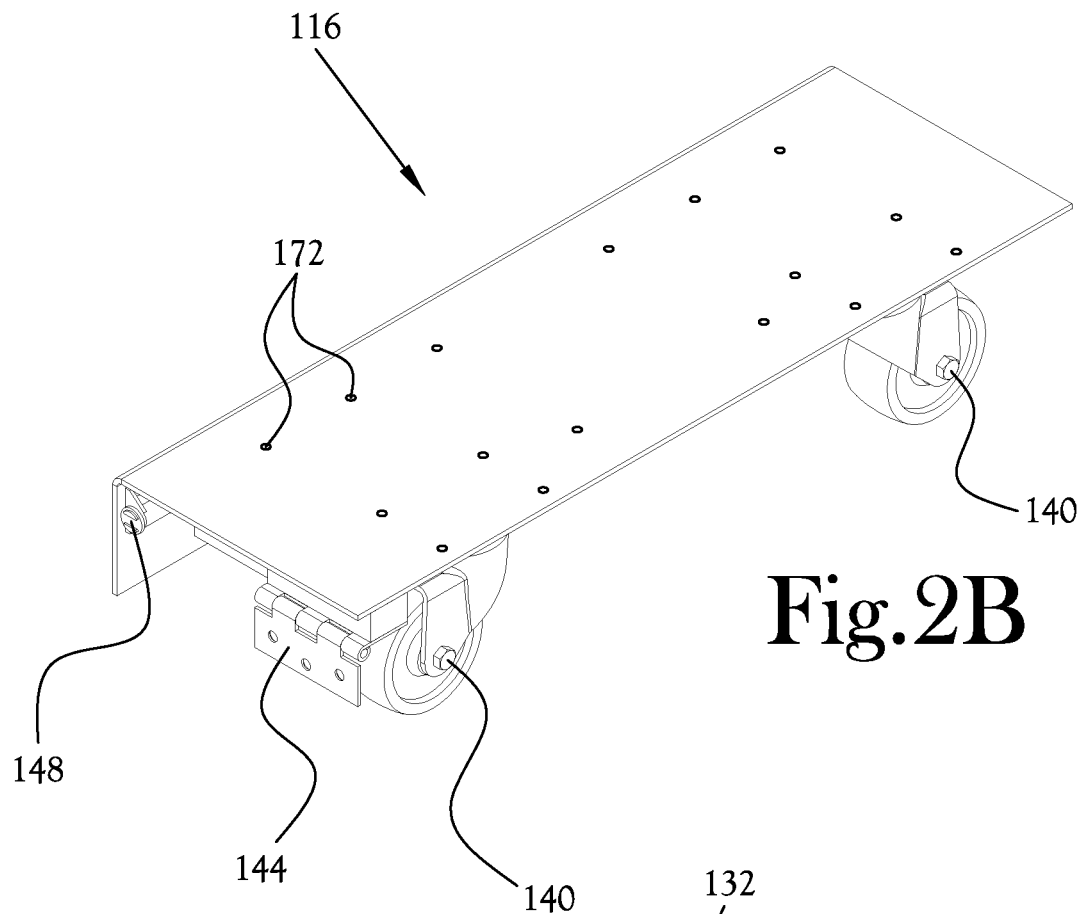
Figure 2C:
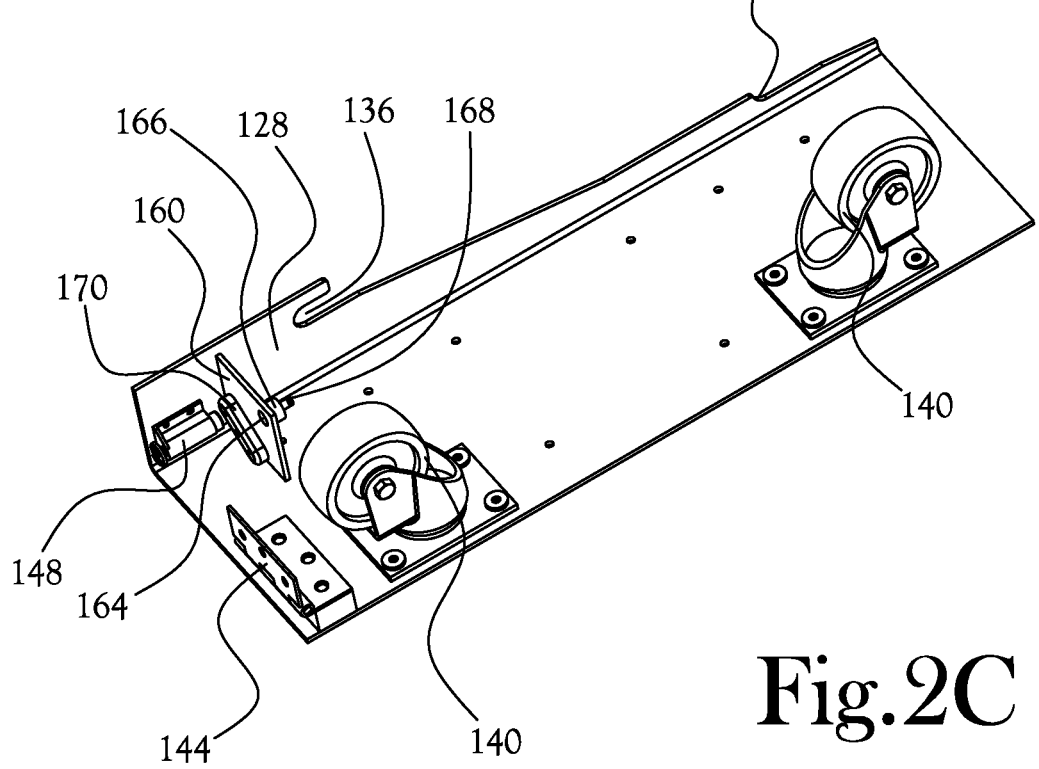
Figure 6A:
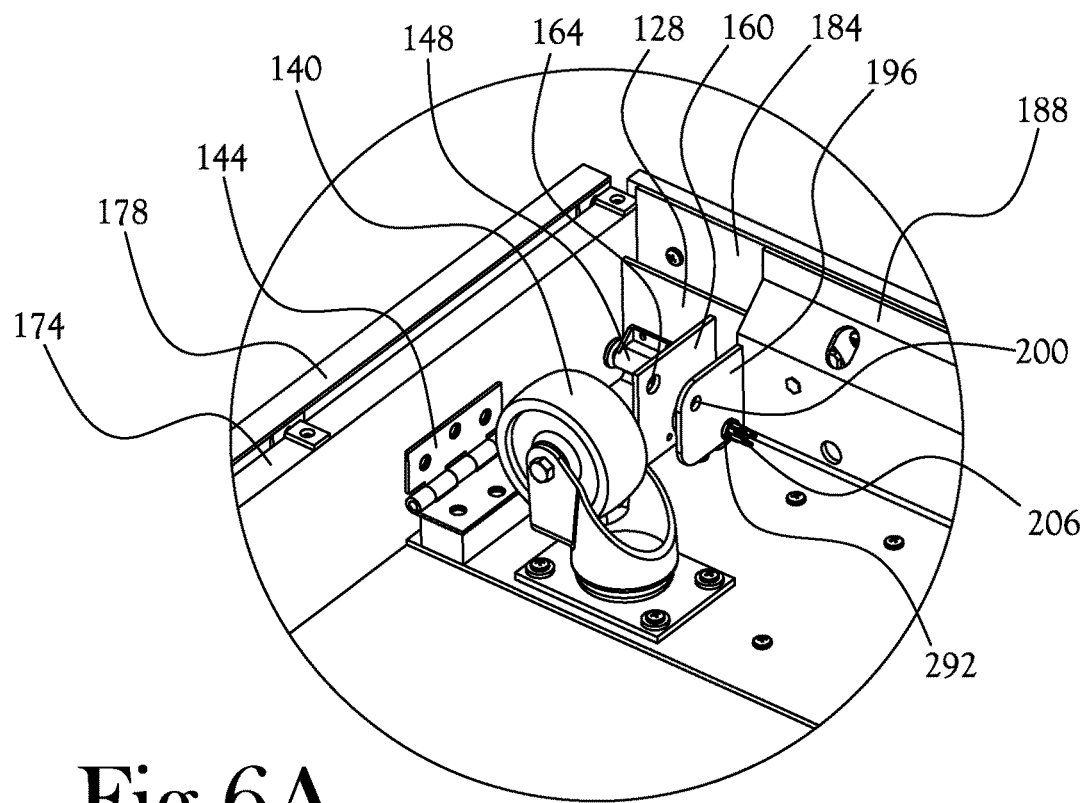
FIGS. 6A-B illustrate a push latch and toe kick panel configuration according to an example embodiment of the present general inventive concept.
Figure 6B:
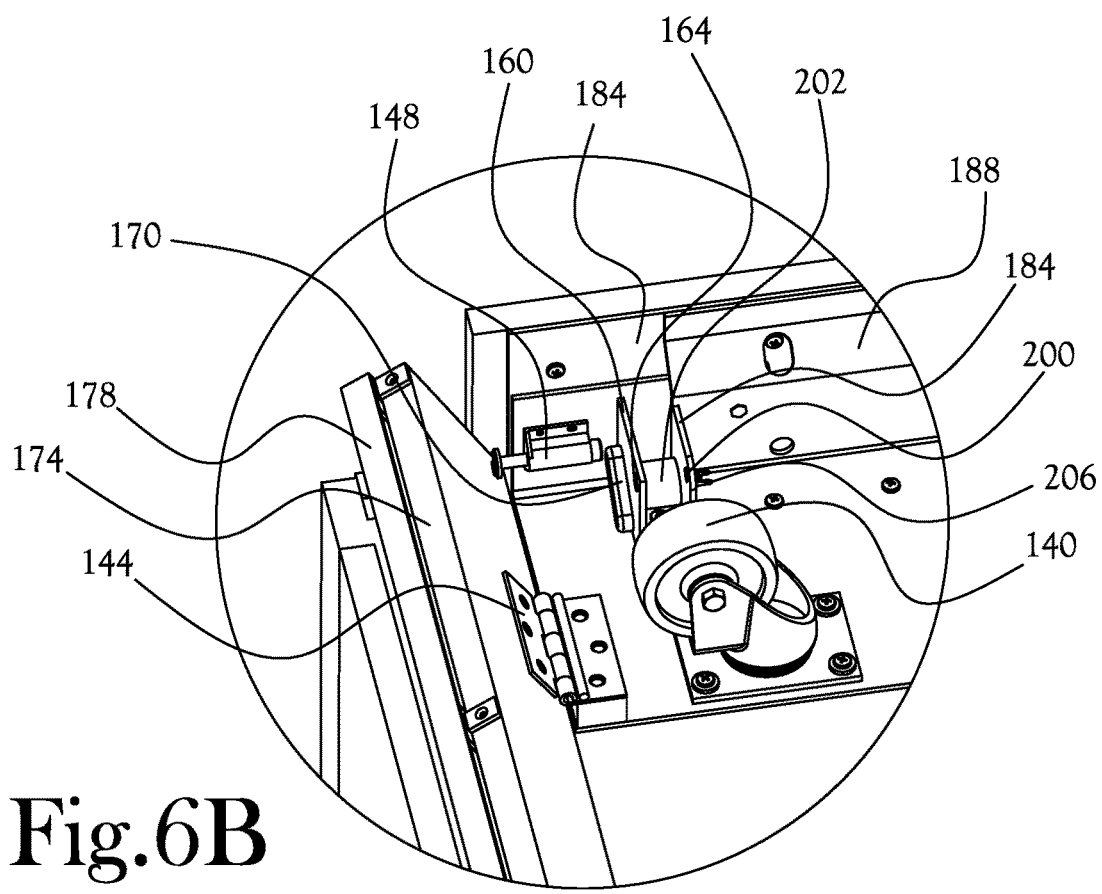

FIGS. 2A-E illustrate the cabinet insert system provided to the cabinet inserts 108 of FIGS. 1A-B. Thus, while the modular cabinet system may include formed cabinet shells 104 and cabinet inserts 108 such as those illustrated in FIGS. 1A-B, the various components, hardware, etc., used to implement the shells and inserts may also be referred to as the modular cabinet system, which may be referred to as including a cabinet insert system and a cabinet shell system, as an end user can take these elements and implement them to form shells and inserts of various different sizes. It is understood that various example embodiments of these systems may include more or fewer elements than those illustrated herein, and may be arranged in a host of different ways, without departing from scope of the present general inventive concept. The cabinet insert system 120 of the example embodiment illustrated in FIGS. 2A-E includes the two second slide members 116 which in this example each include a connection plate 124 configured to be connected to a bottom panel of the cabinet insert 108, and having a plurality of through holes 172 through which threaded members may be passed to secure the connection plate 124 to the cabinet insert 108. The connection plates 124 are configured to be mounted proximate the respective sides and front of the cabinet insert 108 so as to be proximate a pivotable toe kick panel 174 (described later herein), and include guide rails 128 extending downward from the respective outer edges of the connection plates 124 and configured to interact with the first slide members 112 of the cabinet shells 104. Portions of the guide rails 128 are configured in a generally tapered or ramped shape rising toward a back portion of the rails 128, each having a first notch 132 that is formed near a back of the guide rail 128, and a second notch 136 formed near a front of the guide rail 128, the first notch 132 being configured to be higher than the second notch 136 relative to the ramp shape of the guide rail 128. This configuration of the guide rail 128 is designed to work with the first slide member 112 to cause a lifting action when installing the cabinet insert 108, as described herein. A pair of wheel assemblies 140, which in this example embodiment are caster wheel assemblies or caster wheels, are mounted on a bottom of each of the connection plates 124, and arranged to give a steady base on which the cabinet insert 108 rests, and allows the cabinet insert 108 to be easily rolled in any direction. At least one hinge member 144 is provided proximate the front of each of the second slide members 116, and is configured to be attached to the pivoting toe kick panel 174 described herein to allow the toe kick panel 174 to be raised up from a vertical position. In various example embodiments one or more hinge members may be attached to the bottom panel of the cabinet insert 108 instead of, or along with, one or more hinge members attached to the second slide members 116. Also, in various example embodiments the hinge members may be free pivoting, or may be configured as one or more over center or torque or friction hinges to help maintain a position to which the toe kick panel 174 has been pivoted. In the example embodiment illustrated in FIG. 2A, the hinge members 144 swing freely, and a pair of push latches 148 are arranged to interact with the toe kick panel 174. With such an arrangement, a first push on the push latches 148 may allow the toe kick panel 174 to be suspended in a substantially vertical position relative to the cabinet insert 108, a second push on the push latches 148 may cause the extension of the push latch 148 cylinder, which pushes the toe kick panel 174 outward and maintains contact to hold the toe kick panel 174 in an "open" position (which is illustrated in FIGS. 6A-B herein). In various example embodiments of the present general inventive concept one or more securing components may be provided to secure the cabinet insert 108 in place in the cabinet shell 104. In this example embodiment a cam lock 152 is provided and configured to be mounted on each side of the cabinet insert 108 so as to interact with a corresponding cam lock boss mounted on an inner surface of the each side wall of the cabinet shell 104. Thus, turning the cam lock 152 in one direction "locks" the cabinet insert 108 in place in the cabinet shell 108, while turning the cam lock 152 in the opposite direction releases the cabinet insert 108 such that it can be removed from the cabinet shell 104. A plurality of bump rails 156 may be provided and arranged on outer areas of the cabinet insert 108 so as to protect the cabinet insert 108 during movement, and may also aid in the proper insertion of the cabinet insert 108 into the cabinet shell 104 by protecting against contact and/or helping to indicate a proper insertion position. As illustrated in FIG. 2C, a coupling tab 160 is attached to each of the second slide members 116 and configured to interact with corresponding coupling tabs on the first slide members 112 as described herein to secure the cabinet insert 108 in place in the cabinet shell 104. While both the coupling tabs 160 and cam locks 152 are illustrated as being part of the cabinet insert system 120 in this example embodiment, it is understood that various other example embodiments may use one or the other of these components, or altogether different securing arrangements, to secure the cabinet insert 108 in place. The coupling tab 160 includes a through opening 164 to receive a coupling member as described herein. A first electrical connector or electrical connector member 166 is arranged on the coupling tab 160 as male connection, having a prong 168 that connects to a corresponding female electrical connection arranged on the first slide member 112 as described in more detail herein. In this example embodiment the first electrical connector 166 is configured with a securing portion 170 arranged on a front surface of the coupling tab 160 such that the remaining portion of the first electrical connector 166 extends through an opening (not shown) in the coupling tab 160, and away from the back surface of the coupling tab 160.

Figure 2D:
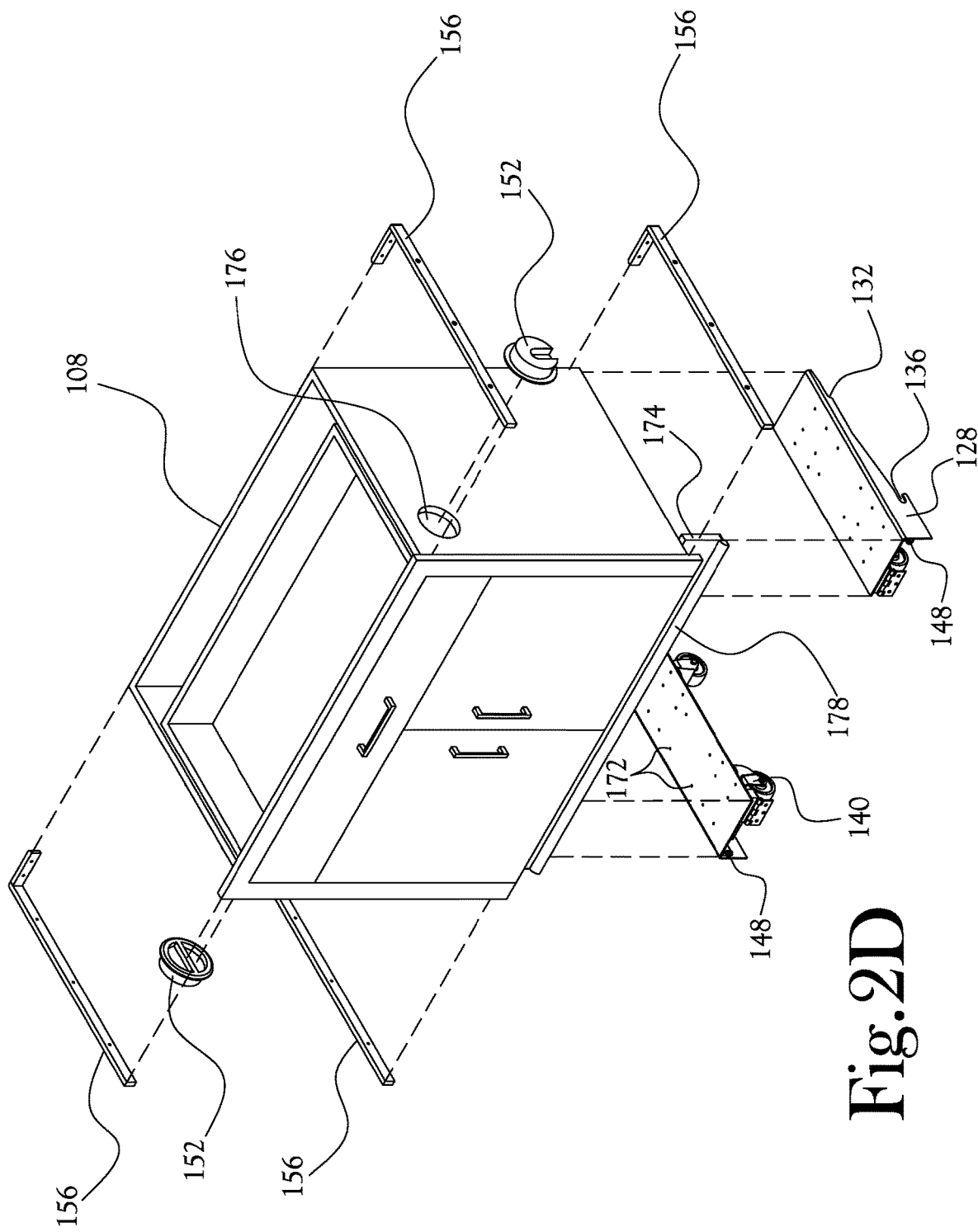
Figure 2E:
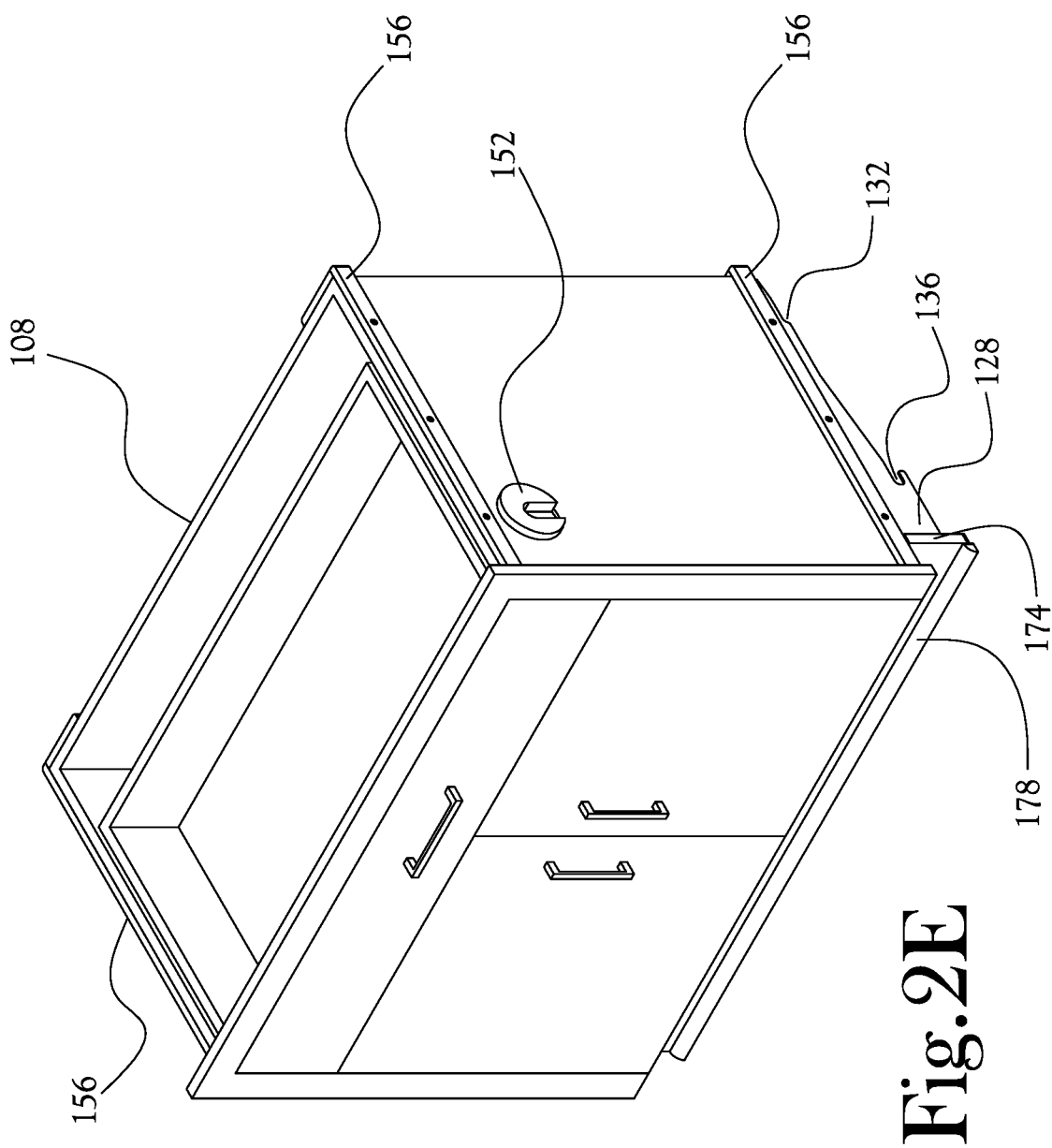

FIG. 2D illustrates an exploded version of the cabinet insert 108 with the components of the cabinet insert system 120 offset from their positions, and FIG. 2E illustrates the assembled cabinet insert 108. As illustrated, a cam lock opening 176 is formed in the side of the cabinet insert 108 for the cam lock 152 to be inserted therein. In various example embodiments, the cam lock 152 may be accessed by opening or removing a drawer. In other example embodiments, such as cabinet inserts with shelves, the cam lock may remain openly accessible by simply opening a cabinet door. A shoe molding strip 178 may be configured to be coupled to the toe kick panel 174 such that the shoe molding strip 178 is movable relative to the toe kick panel 174, so that the position of the shoe molding strip 178 may be adjusted to better match an angled or otherwise uneven floor surface under the shoe molding strip 178. The coupling of the shoe molding strip 178 to the toe kick panel 174 may be formed with a plurality of shoe molding magnets 220 (illustrated in FIG. 5) which may be included in the cabinet insert system 120 in various example embodiments of the present general inventive concept.

Figure 3A:
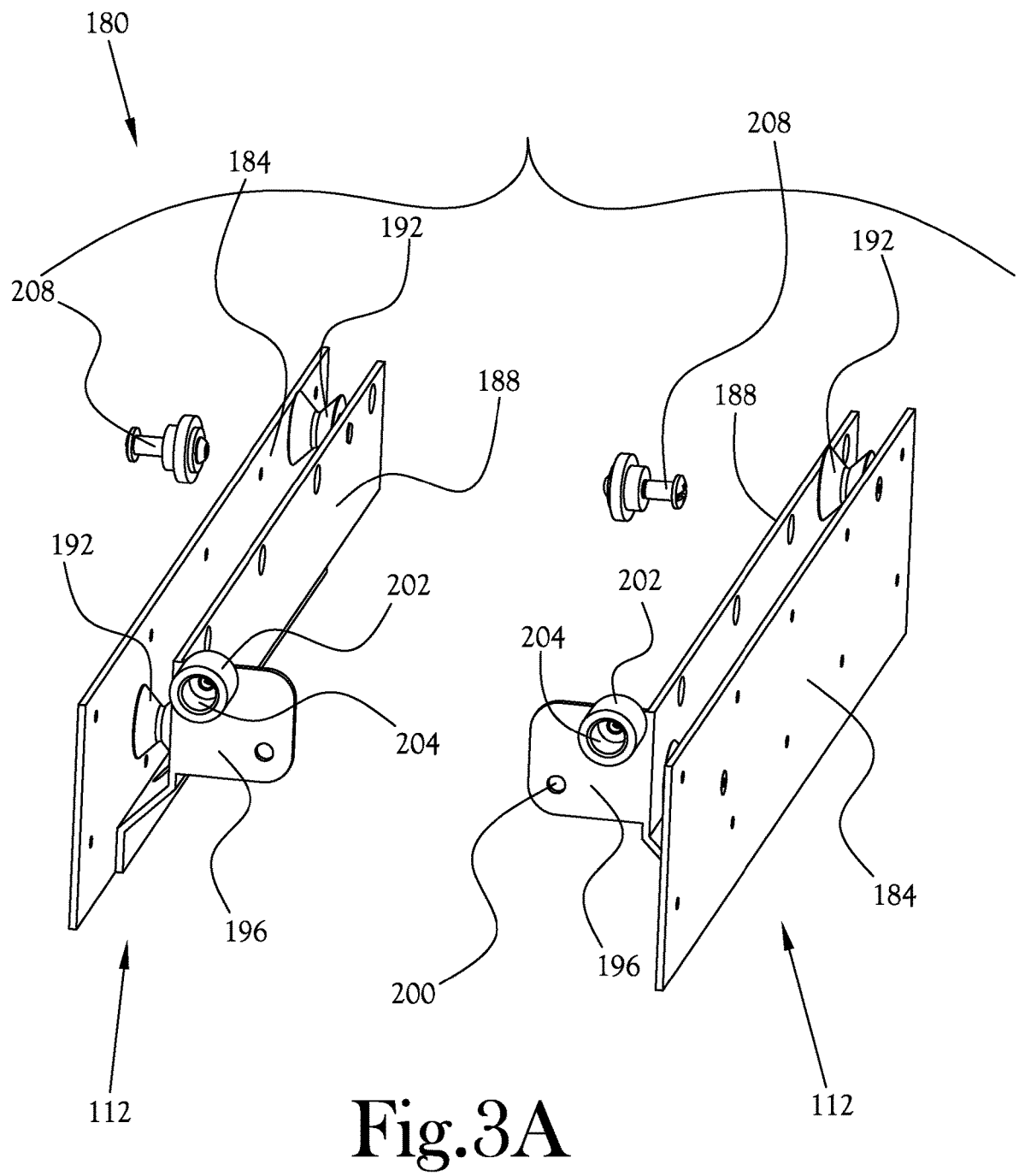
FIGS. 3A-E illustrate the cabinet shell system provided to the cabinet shells of FIGS. 1A-B.
Figure 3B:
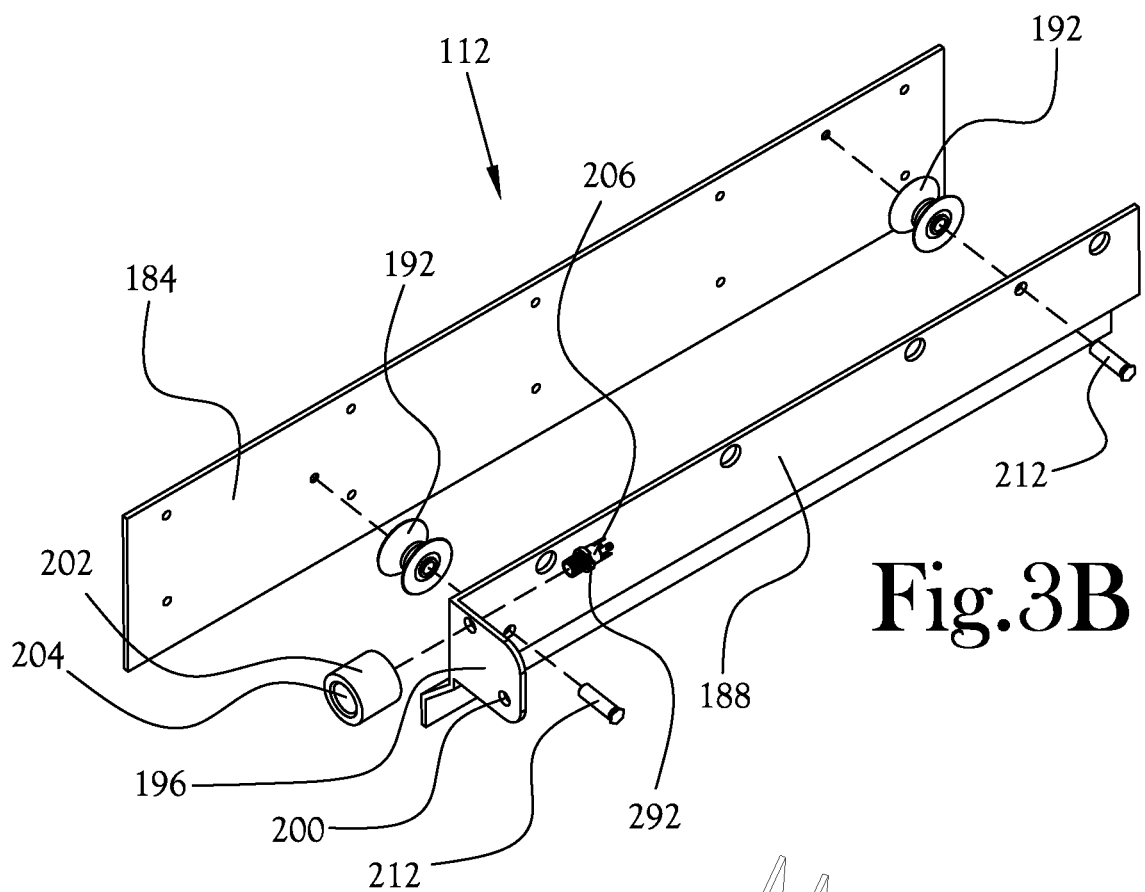
Figure 3C:
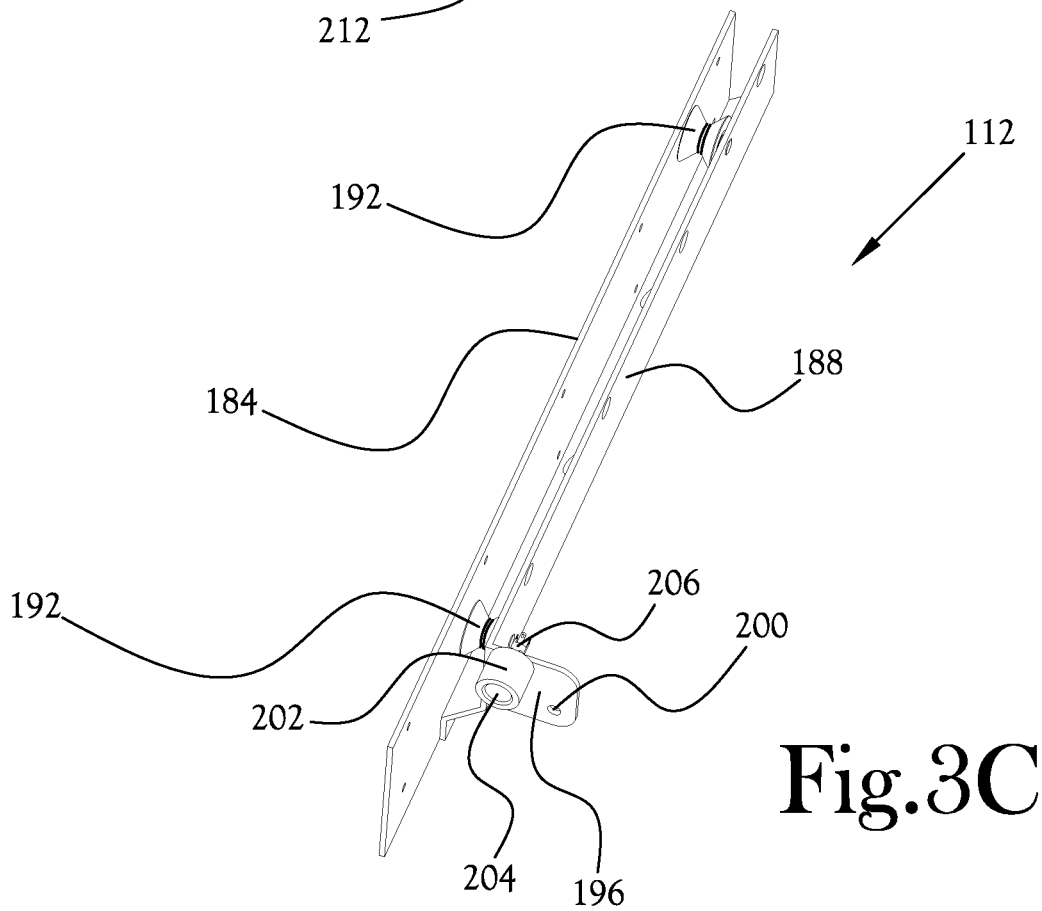
Figure 3D:
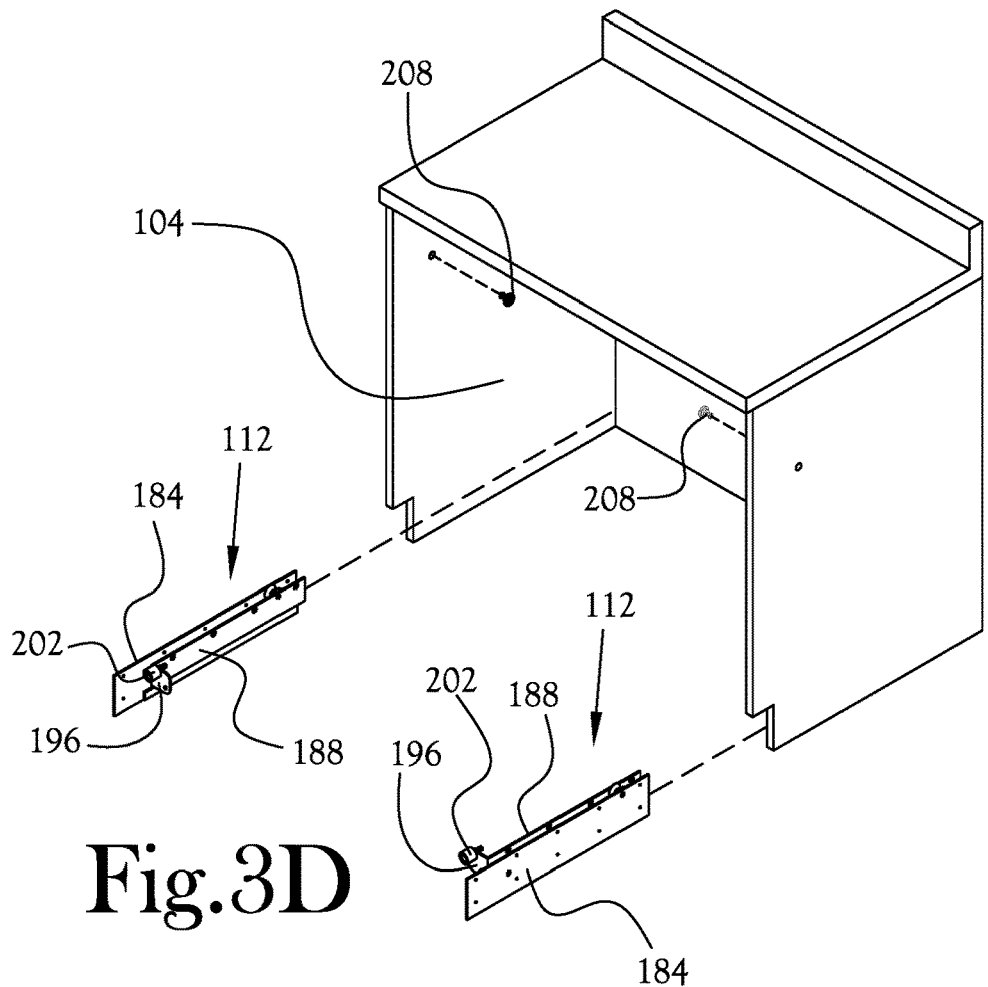
Figure 3E:
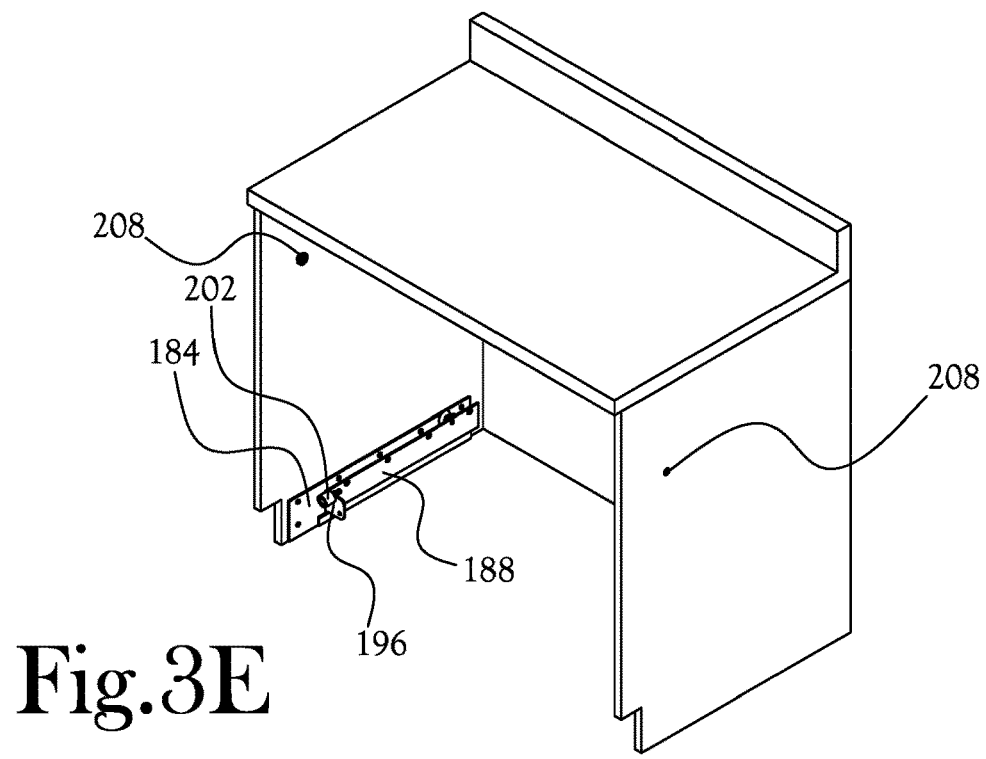

FIGS. 3A-D illustrate the cabinet shell system provided to the cabinet shells 104 of FIGS. 1A-B. The cabinet shell system 180 includes the first slide members 112 illustrated in FIGS. 1A-B, and each of the first slide members 112 in this example embodiment include a connection plate 184 configured to be attached to an inner surface of a side wall of the cabinet shell 104. The connection plates 184 are arranged with a plurality of through holes to receive threaded members to attach the connection plates 184 to the cabinet shell 104 walls. Each connection plate 184 has a support plate 188 attached to, and offset from, the connection plate 184 so as to support a plurality of guide rollers 192 therebetween. The guide wheels 192 are arranged so as to guide and support the guide rail 128 of the second slide members 116, and in this example embodiment are configured as V-shaped rollers so as to aid in the centering of the guide rail 128 on the guide rollers 192. Of the pair of guide rollers 192 provided to each first slide member 112, one of the rollers 192 is arranged proximate the rear of the first slide member 112, and the other one of the rollers 192 is arranged proximate the front of the first slide member 112 and lower than the rear roller 192. This guide roller 192 arrangement corresponds to the first and second notches 132, 136 formed on the guide rails 128 of the second slide members 116. Connection pins 212 extend between the connection plate 184 and support plate 188 to support the guide rollers 192. A coupling tab 196 is provided to each of the first slide members 112, connected to the respective support plates 188. The coupling tabs 196 are arranged to be in close proximity with the corresponding coupling tabs 160 of the second slide members 116, so as to enable a coupling arrangement between the first and second slide members 112, 116, when the cabinet insert 108 is installed in the cabinet shell 104. Each coupling tab 196 has a through opening 200 configured to receive a coupling member, and a through opening (not shown) in which a second electrical connector or electrical connector member 202 is arranged so as to mate or be connected with the first electrical connector 166 illustrated in FIG. 2C. The second electrical connector 202, configured as a female connection, is configured with a receiving portion 204 arranged on a front surface of the coupling tab 196, and electrical leads 206 arranged so as to extend from a back surface of the coupling tab 196. A pair of cam lock bosses 208 are provided to be connected to the respective walls of the cabinet shell 104 to interact with the cam locks 152 of the cabinet insert system 120 so as to secure the cabinet insert 108 inside the cabinet shell 104. FIG. 3D illustrates the components of the cabinet shell system 180 exploded from the cabinet shell 104, and FIG. 3E illustrates the cabinet shell system 180 components installed in the cabinet shell 104.

Figure 4B:
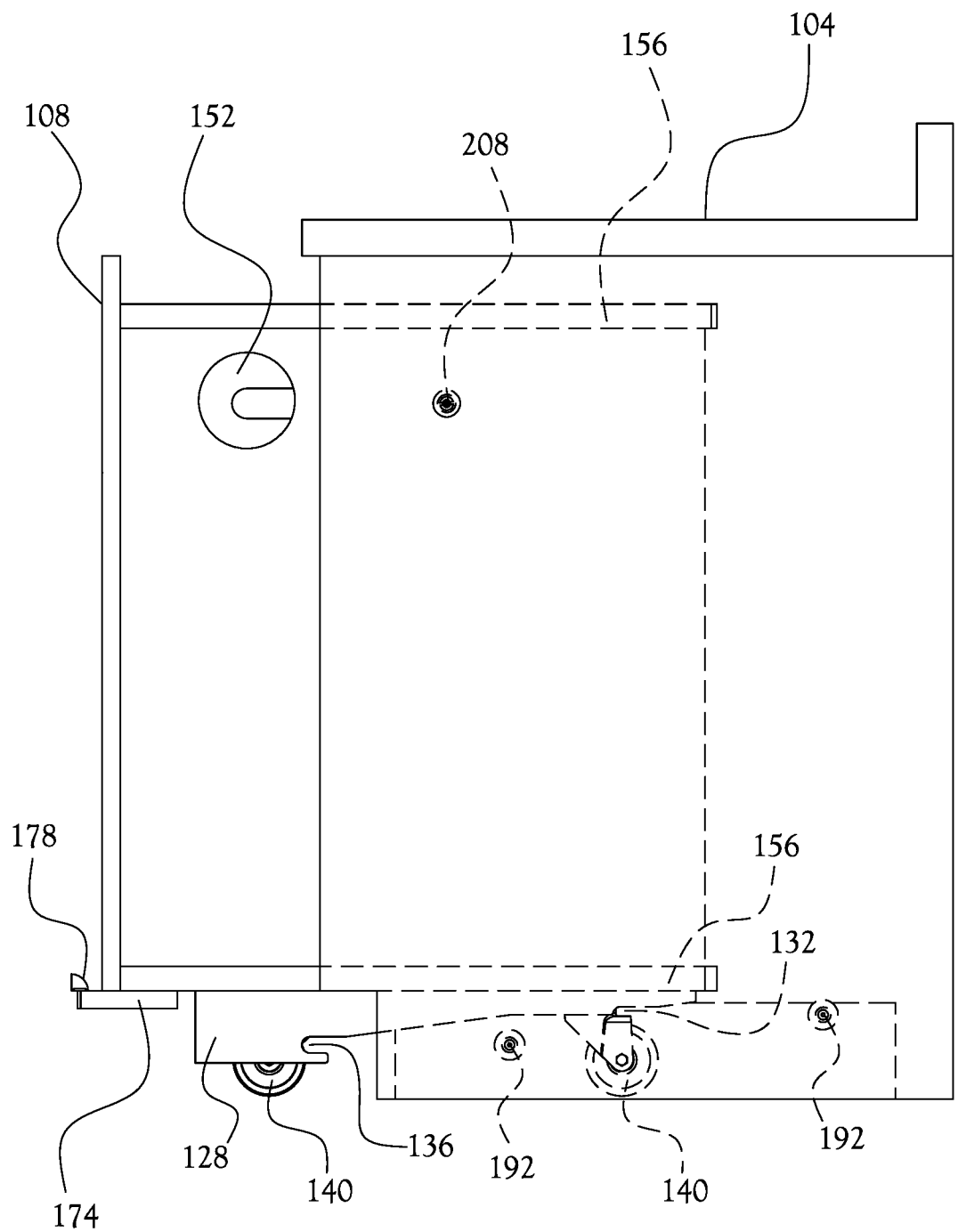
Figure 4C:
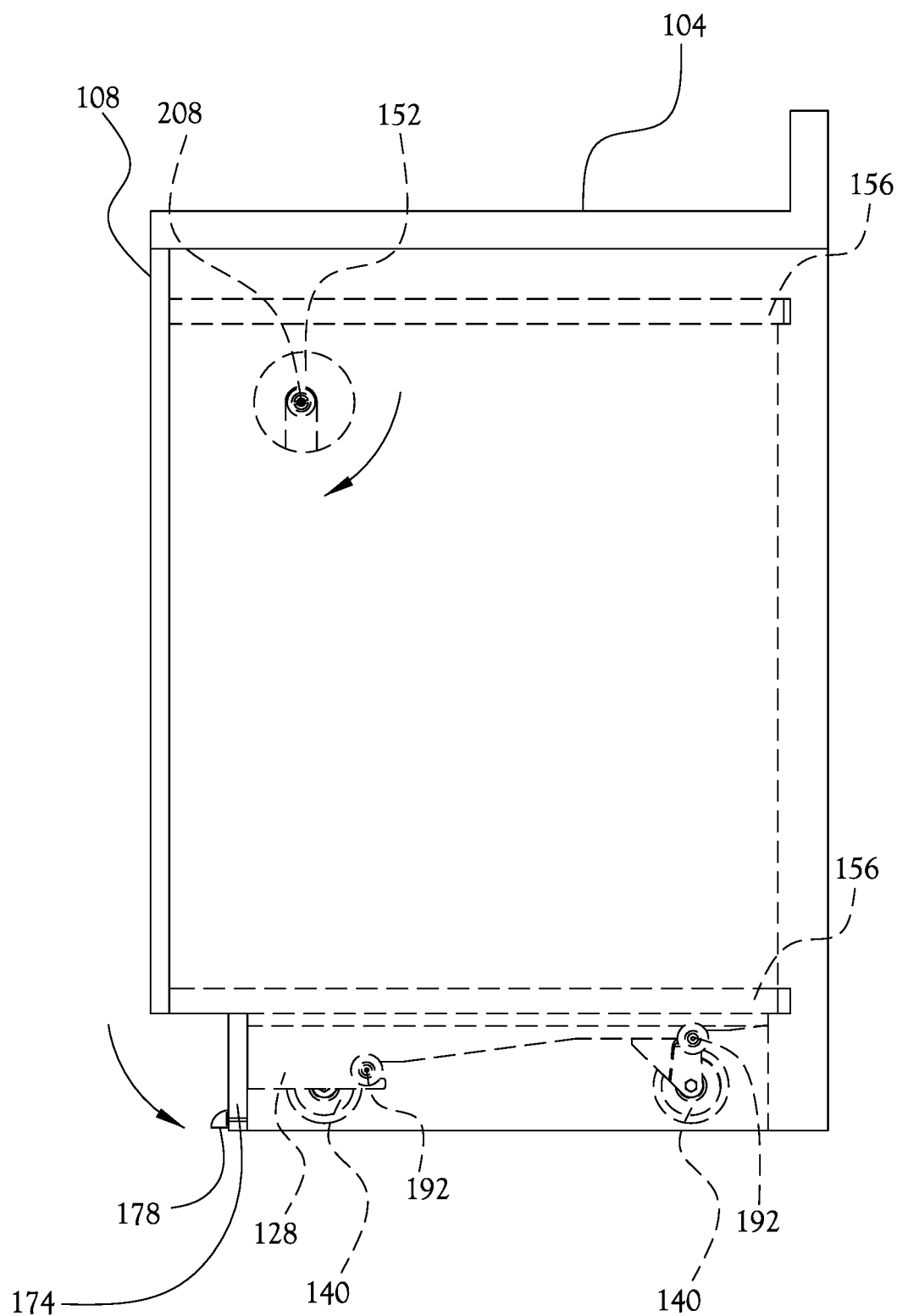
Figure 4D:
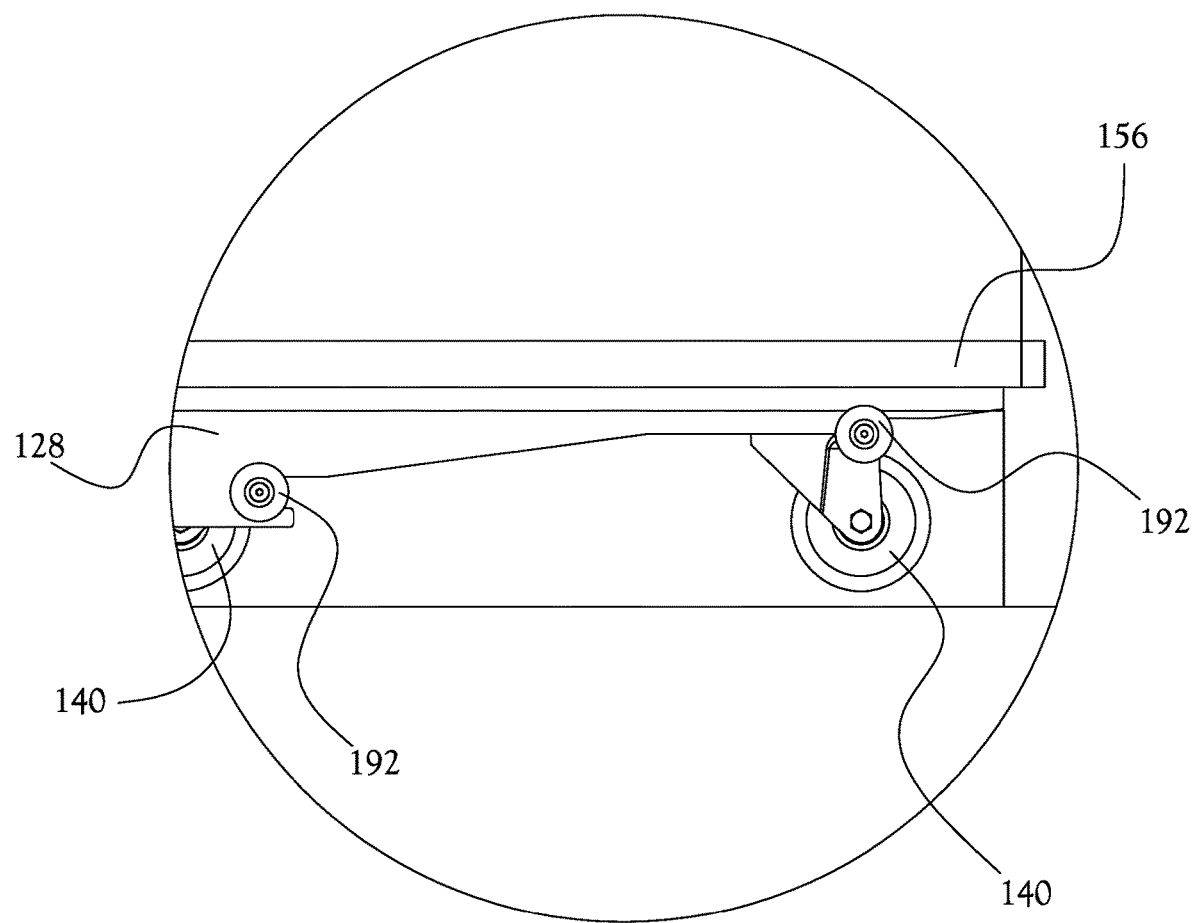

FIGS. 4A-D illustrate the operations of installing the cabinet inserts 108 into the cabinet shells 104 of FIGS. 1A-B. In FIG. 4A, the modular cabinet insert 108 is being rolled toward the cabinet shell 104 for installation therein. As illustrated, the toe kick panel 174 is in a raised position so as to not interfere with the transport of the cabinet insert 108. A user may also raise the toe kick panel 174 to this or another raised position to access the bottom space below the cabinet insert 108 when the cabinet insert 108 is installed in the cabinet shell 104 to perform operations such as coupling the cabinet insert 108 to the cabinet shell 104. The toe kick panel 174, which is rotatable or pivotable between a lowered, substantially vertical position and a raised position, may be held in the raised position by a friction hinge, push latch, or other such arrangement. While the toe kick panel 174 in FIG. 4A is illustrated as being pivoted all the way to a substantially horizontal orientation, it is understood that various example embodiments may provide componentry to maintain the orientation of the toe kick panel 174 at a smaller angle to provide clearance while moving the cabinet insert 108. As illustrated in FIG. 4B, the cam lock 152, the operation of which is known, is rotated with the open receiving portion facing forward to receive the cam lock boss 208 mounted in the cabinet shell 104 when the cabinet insert 108 is pushed further into the shell 104. The cam lock 152 may be accessed in some embodiments by pulling an installed drawer out far enough to access the cam lock 152 located to the drawer's side, may be openly exposed in a shelving arrangement on an inner side wall of the insert 108, etc. The ramped portion of the guide rail 128 is configured such that a rear portion of the guide rail 128 passes over the forwardmost guide roller 192 without contact during initial insertion of the cabinet insert 108. As the cabinet insert 108 is moved further into the cabinet shell 104, the ramped portion of the guide rail 128 makes contact with both of the guide rollers 192, and is raised slightly off of the floor surface below the cabinet shell 104. The guide rail 128 moving along the top of the guide rollers 192 provides a smooth entry of the cabinet insert 108 even as the wheels or wheel assemblies 140 are lifted above the floor. FIG. 4D shows a closer view of the wheel assemblies 140 being lifted over the floor when the cabinet insert 108 is fully installed in the cabinet shell 104. As illustrated in FIG. 4D, the guide rollers 192 also respectively abut the first and second notches 132, 136 so as to prevent more forward movement of the cabinet insert 108, giving the user an easily sensible tactile indicator that the cabinet insert 108 is fully inserted. The bump rails 156 may be arranged to as to contact the proximate inner surfaces of the cabinet shell 104 when fully installed. As illustrated in FIG. 4C, after the cabinet insert 108 has been fully installed, a user may rotate the cam lock 152 about the cam lock boss 208 so as to "lock" the cabinet insert 108 in place in the cabinet shell 104, and rotate the toe kick panel 174 down to a substantially vertical position. In various example embodiments, as described herein, there may be coupling elements, either in combination with the cam lock 152 or in lieu of, located just behind the toe kick panel 174 that may be used to secure the cabinet insert 108 inside the cabinet shell 104. After the toe kick panel 174 has been lowered, the shoe molding strip 178 may be adjusted to account for an uneven floor. To remove the cabinet insert 108, these operations can simply be reversed so that the insert 108 can be pulled out and conveniently moved to a desired location.

Figure 5:
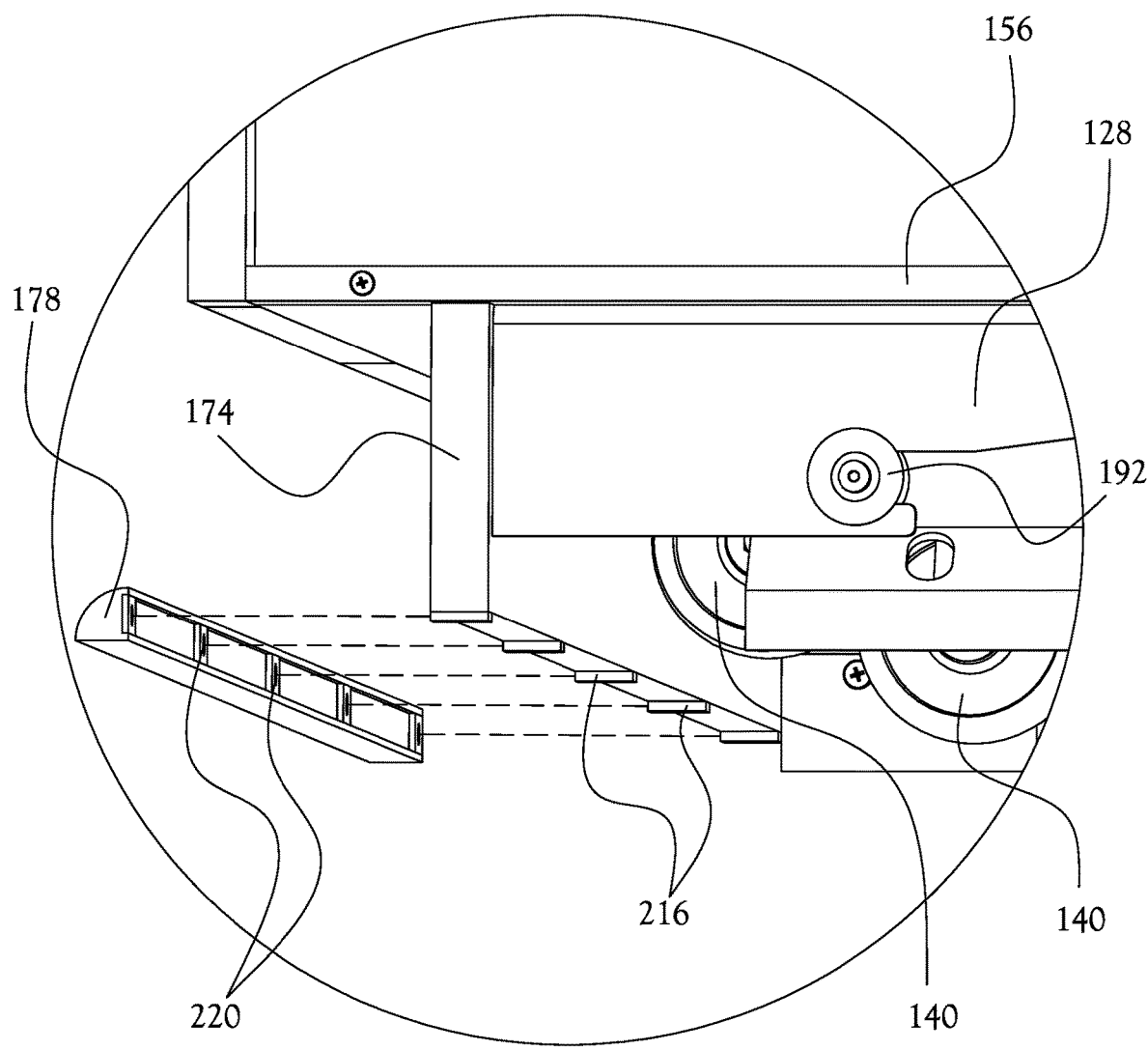
FIG. 5 illustrates a toe kick panel and shoe molding strip arrangement according to an example embodiment of the present general inventive concept.

FIG. 5 illustrates a toe kick panel and shoe molding strip arrangement according to an example embodiment of the present general inventive concept. As previously described, various example embodiments may provide an adjustable shoe molding strip 178 coupled to the toe kick panel 174. In the example embodiment illustrated in FIG. 5, a plurality of toe kick panel magnets 216 are arranged proximate a bottom portion of the toe kick panel 174, and a plurality of shoe molding magnets 220 are arranged on a back surface of the shoe molding strip 178 in locations corresponding to the toe kick panel magnets 216. With such an arrangement, the shoe molding strip 178 may be moved relative to the toe kick panel 174 to more closely fit an uneven floor, or to be replaced/repaired, etc.

FIGS. 6A-B illustrate a push latch and toe kick panel configuration according to an example embodiment of the present general inventive concept. In this example embodiment, FIG. 6A illustrates the toe kick panel 174 in a lowered or closed position, and FIG. 6B illustrates the toe kick panel 174 in a raised or open position. Thus, with the push latch 148 arranged as shown on the second slide member 116, an extended cylinder of the push latch 148 may be arranged with sufficient bias to hold the toe kick panel 174 open for movement of the cabinet insert 108 without floor interference with the toe kick panel 174. When the cabinet insert 108 is fully installed, a user can simply use their foot to push the toe kick panel 174 downward to a substantially vertical position, the action of which pushes the push latch 148 to a second position which allows the toe kick panel 174 to remain in the vertical position. The hinge members 144 coupling the toe kick panel 174 to the overall cabinet insert 108 can be free-swinging in such an arrangement, or other friction hinges or different position-holding hinges may be employed. To raise the toe kick panel 174, the user can again press the toe kick panel 174 with their foot to actuate the push latch 148 to return the extending cylinder of the push latch back to the first position that biases the toe kick panel 174 in the raised position for transport.

Figure 7A:
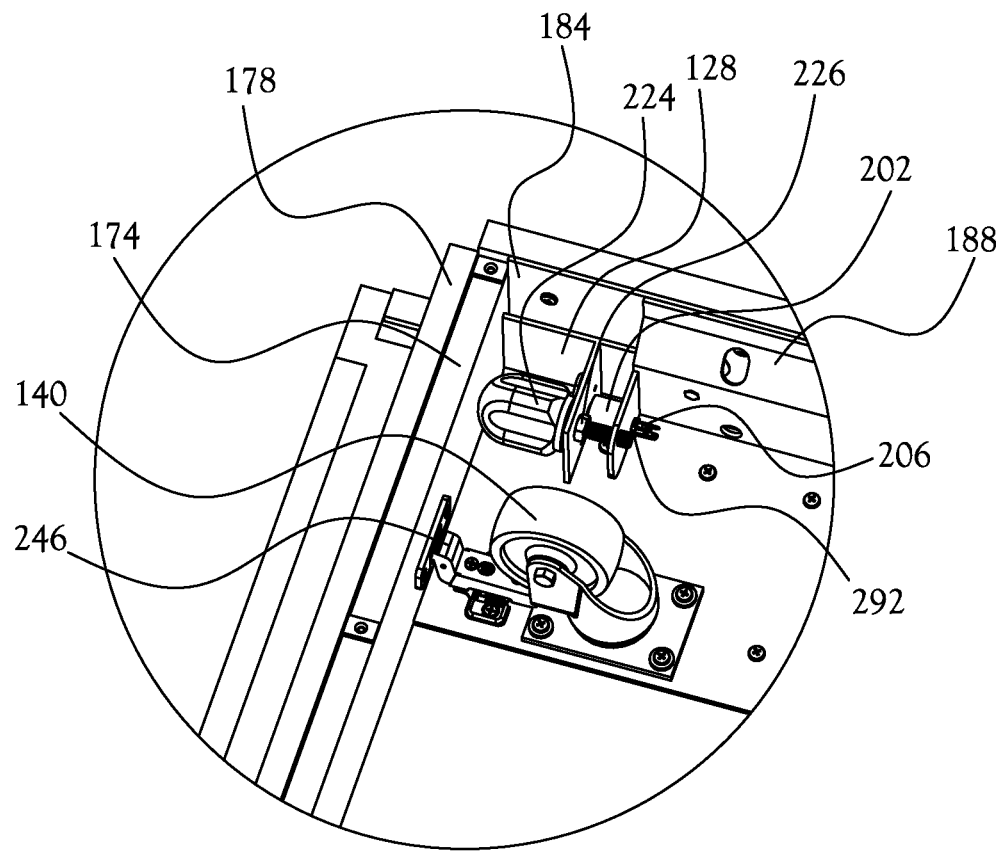
FIGS. 7A-B illustrate securing components configured to secure a cabinet insert in a cabinet shell according to an example embodiment of the present general inventive concept.
Figure 7B:
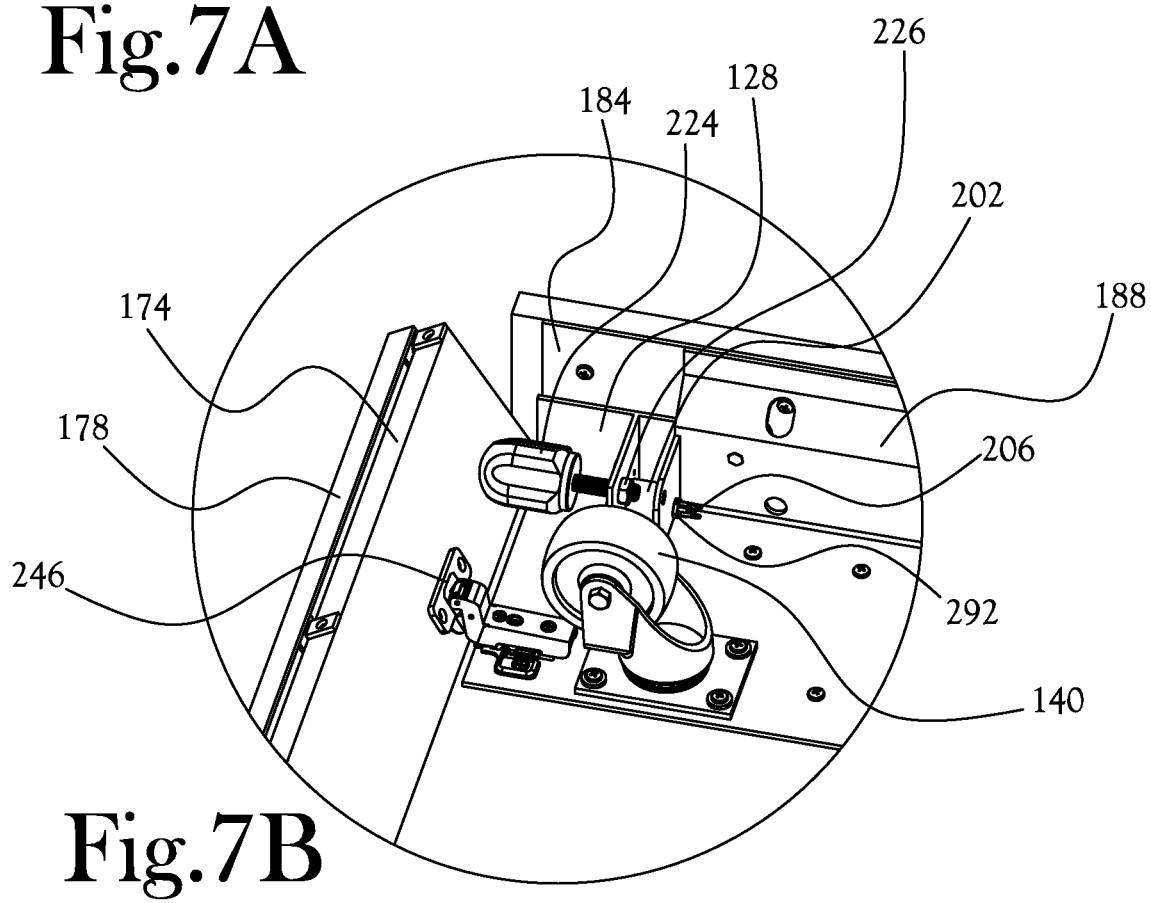

FIGS. 7A-B illustrate securing components configured to secure a cabinet insert in a cabinet shell according to an example embodiment of the present general inventive concept. As illustrated in this example embodiment, the coupling tab 160 of the second slide member 116 is arranged so as to be proximately facing the coupling tab 196 of the first slide member 112 when the cabinet insert 108 is installed in the cabinet shell 104. With such an arrangement, the through opening 200 of the coupling tab 196 is substantially aligned with the through opening 164 of the coupling tab 160, and a threaded member such as the knob screw 224 can be threaded through both of the corresponding through holes or openings 164, 200 to secure or hold the cabinet insert 108 in place in the cabinet shell 104. A retaining nut 226 may be provided about the through opening 164 of the coupling tab 160 on the second side member 116, so that the knob screw 224 or other securing threaded member can be stably maintained in the through opening 164 when not threaded through the coupling tab 196 of the cabinet shell 104, so that the cabinet insert 108 can be moved between locations without having to completely remove the knob screw 184. In some example embodiments, the knob screw 224 stabilized by the retaining nut 226 may even be configured to hold the toe kick panel 174 in a raised position along with, or in lieu of, the push latch 148 or friction springs. As illustrated, the knob screw 224 may be provided with a relatively large handle for easy identification and operation of the knob screw 224 when the cabinet insert 108 is in the cabinet shell 104. The arrangement of the coupling tabs 160, 196 and the knob screw 224 may fix the cabinet insert 108 in place in the cabinet shell 104 along with the previously described cam lock 152, or in substation for the cam lock in various example embodiments.

Figure 8A:
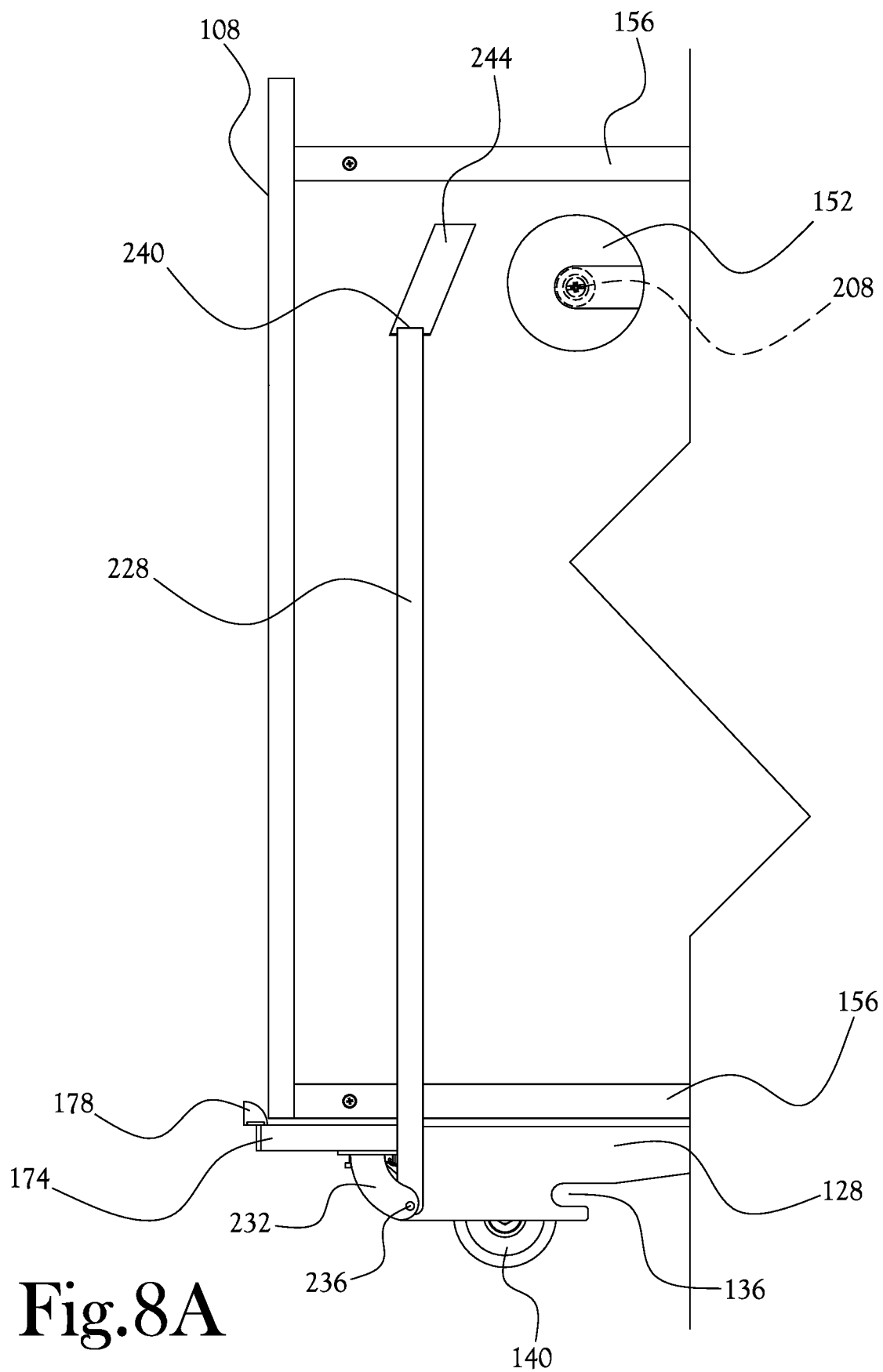
FIGS. 8A-D illustrate securing components configured to secure a cabinet insert in a cabinet shell according to another example embodiment of the present general inventive concept.
Figure 8B:
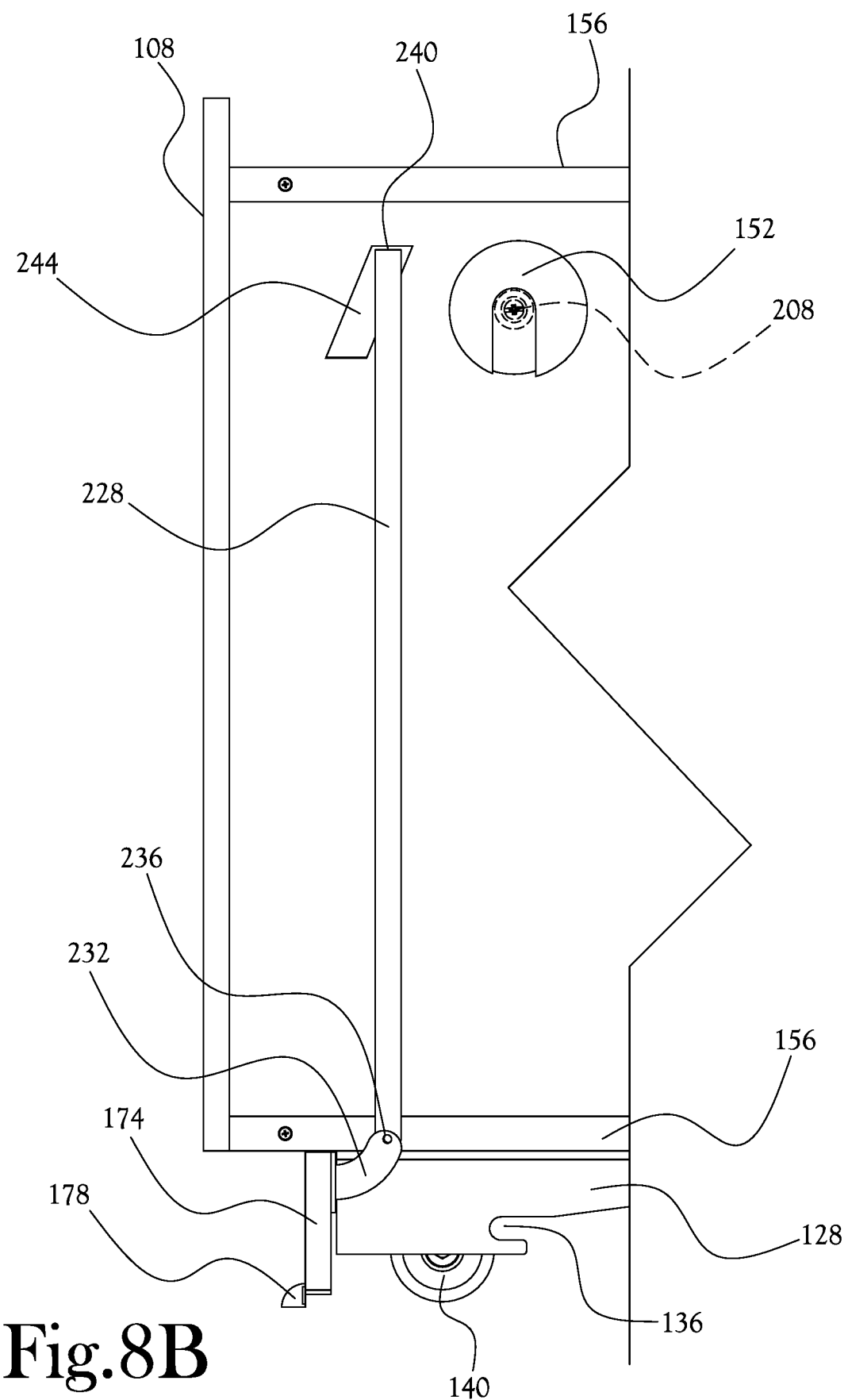
Figure 8C:
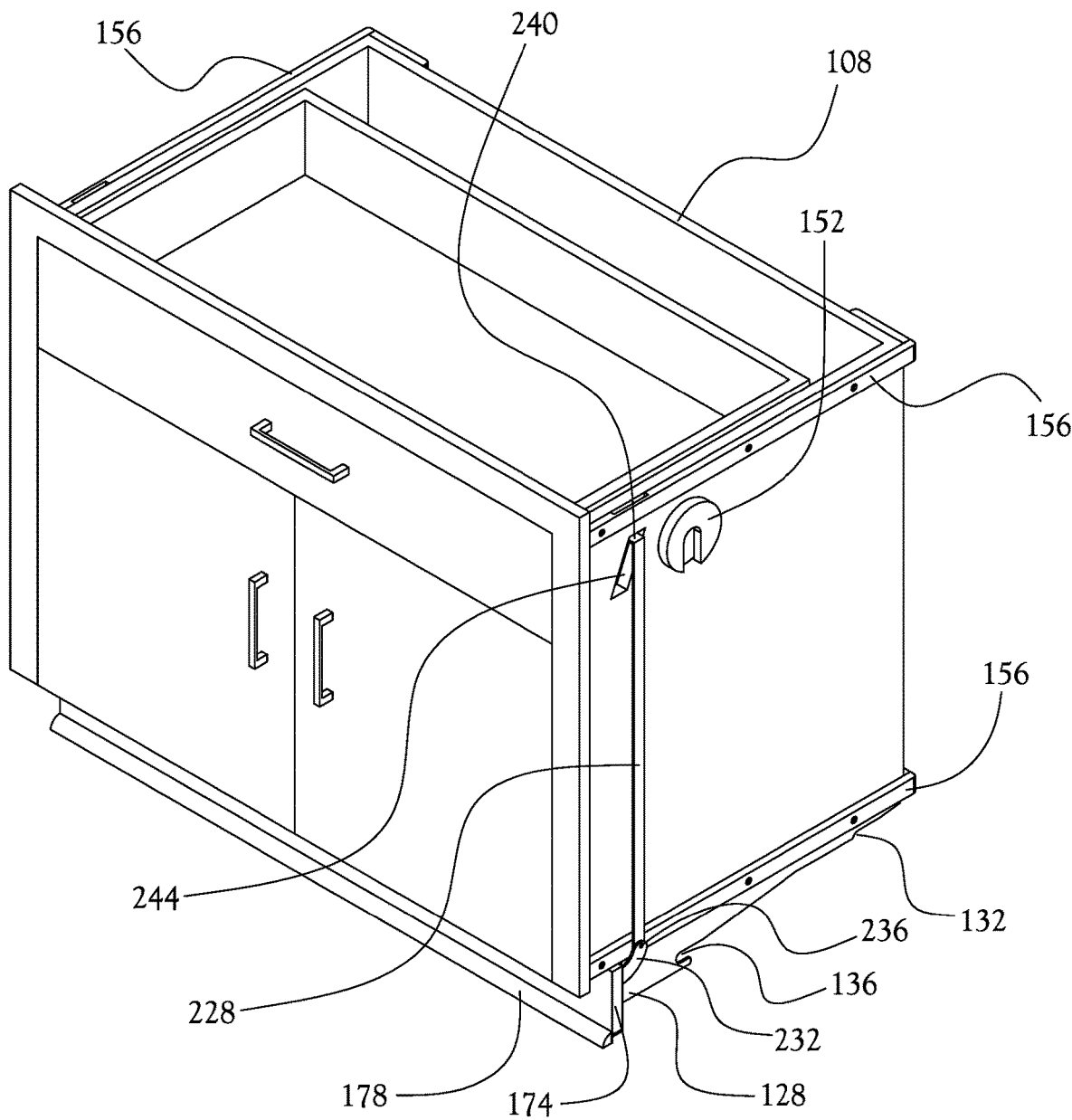
Figure 8D:
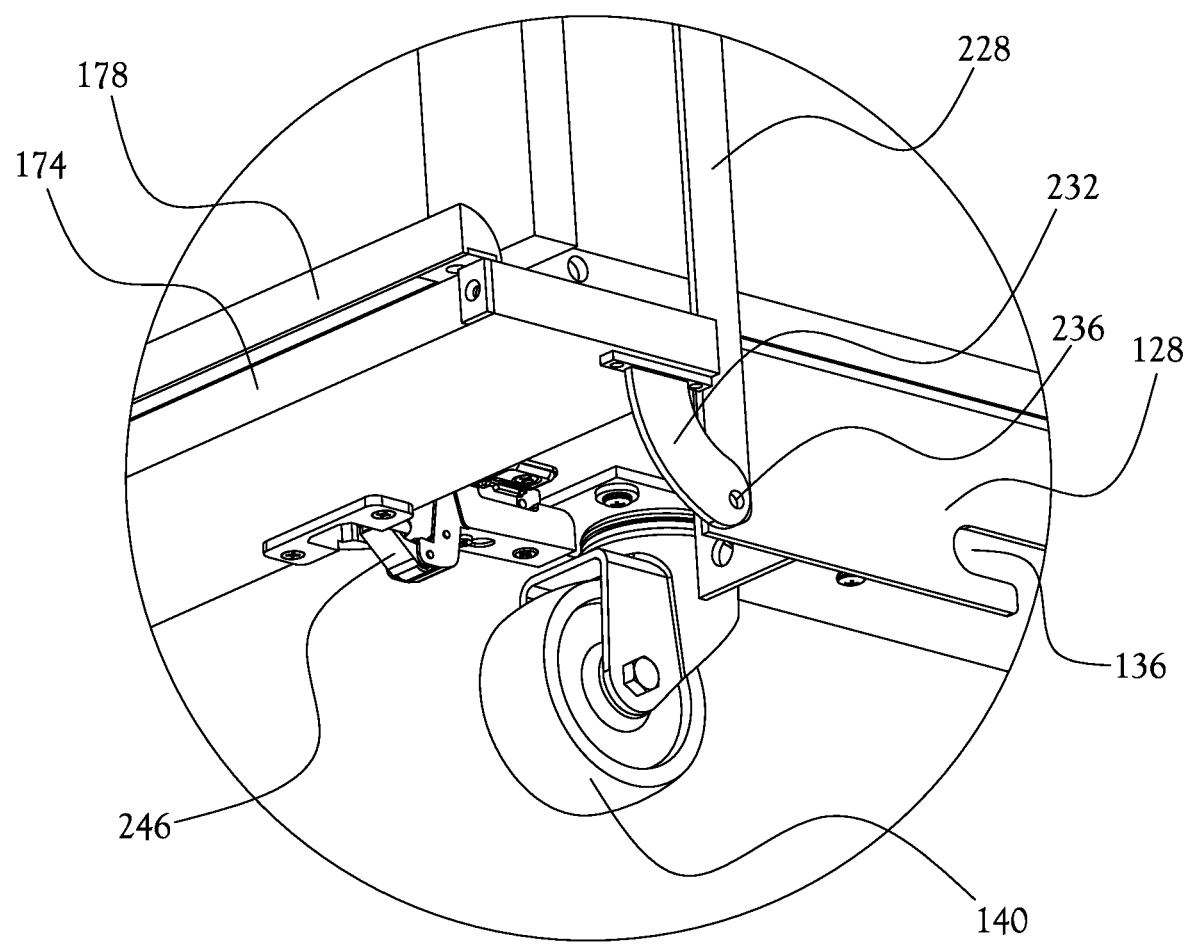

FIGS. 8A-D illustrate securing components configured to secure a cabinet insert in a cabinet shell according to another example embodiment of the present general inventive concept. In the example embodiment illustrated in these drawings, FIGS. 8A-D shows the cabinet insert 108 being moved into the cabinet shell 104, and FIGS. 8B-C show various views of the cabinet insert 108 with the securing mechanism components arranged such as they would be after the cabinet insert 108 has been secured in the cabinet shell 104 in this example embodiment. Along with the previously described cam lock 152 and cam lock boss 208 arrangement, the example embodiment illustrated in FIGS. 8A-D is configured with an extended bar member 228 that is coupled proximate a bottom end of the bar member 228 to a back surface of the toe kick panel 174 by a link member 232 that is rotatably coupled at a first end to the bar member 228. The bar member 228 is configured with a bent tab 240 at a top end of the bar member 228 that extends through a slot 244 in the corresponding side wall of the cabinet insert. Thus, by pushing down on the tab 240 of the bar member, the downward force causes the rotating link member 232 to push the toe kick panel 174 outward and upward to the raised position. Although the raised position is shown as substantially horizontal in FIG. 8A, it is understood that this arrangement may only raise the toe kick panel 174 to a more acute angle without departing from the scope of the present general inventive concept. In FIG. 8A the bar member 228 has been moved downward such that the tab 240 is near the bottom of the slot 244, raising the toe kick panel 174 to the raised position shown. In FIGS. 8B-C the bar member 228 has been moved upward such that the tab 240 is near the top of the slot 244, lowering the toe kick panel 174 to the lower position shown. In various example embodiments either end of this coupled mechanism might actuate the other, i.e., the toe kick panel 174 may be raised by pushing the bar member 228 downward, but the bar member 228 can also be moved upward by pushing toe kick panel 174 downward toward the lowered or closed position. FIG. 8D illustrated a friction hinge 246, which in this example embodiment is an over center hinge, which aids in maintaining the rotatable toe kick panel 174 in one or more positions. Much like the cam lock 152, the tab 240 of the bar member 228 may be accessed by extending or removing a drawer in some example embodiments of the cabinet insert, or may be openly exposed in some shelving arrangements, etc.

Figure 9A:
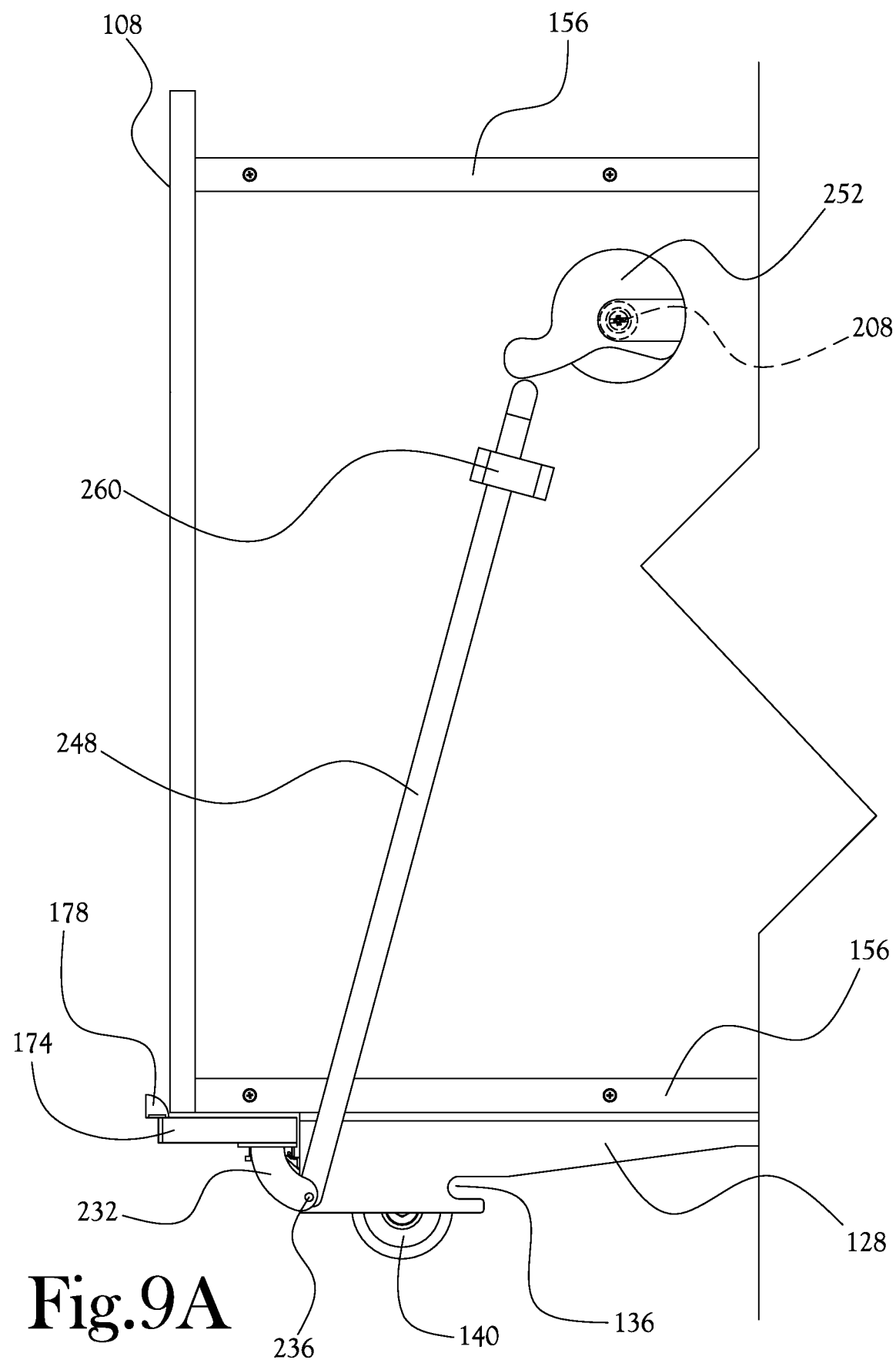
FIGS. 9A-B illustrate securing components configured to secure a cabinet insert in a cabinet shell according to still another example embodiment of the present general inventive concept.
Figure 9B:
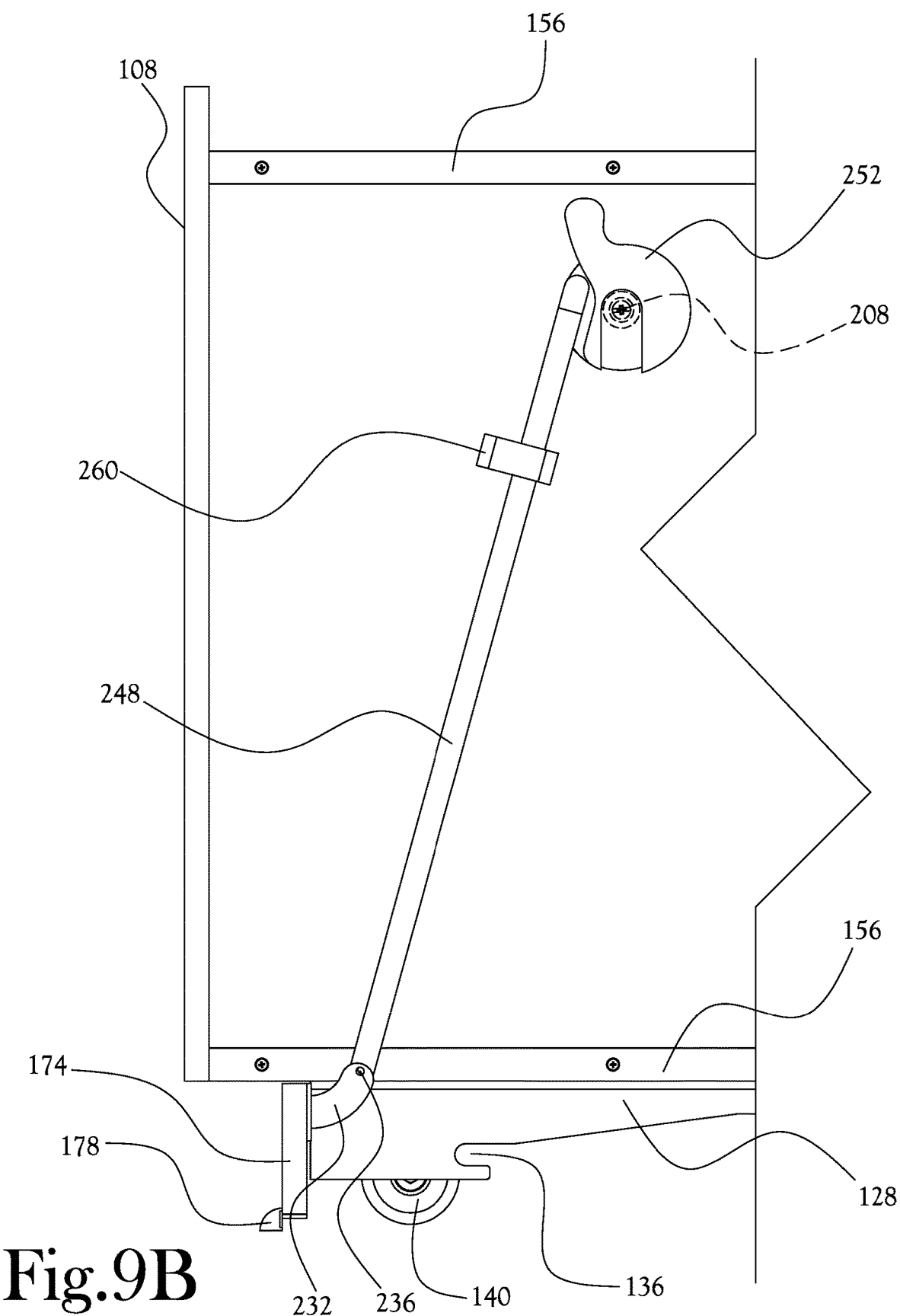
Figure 10A:
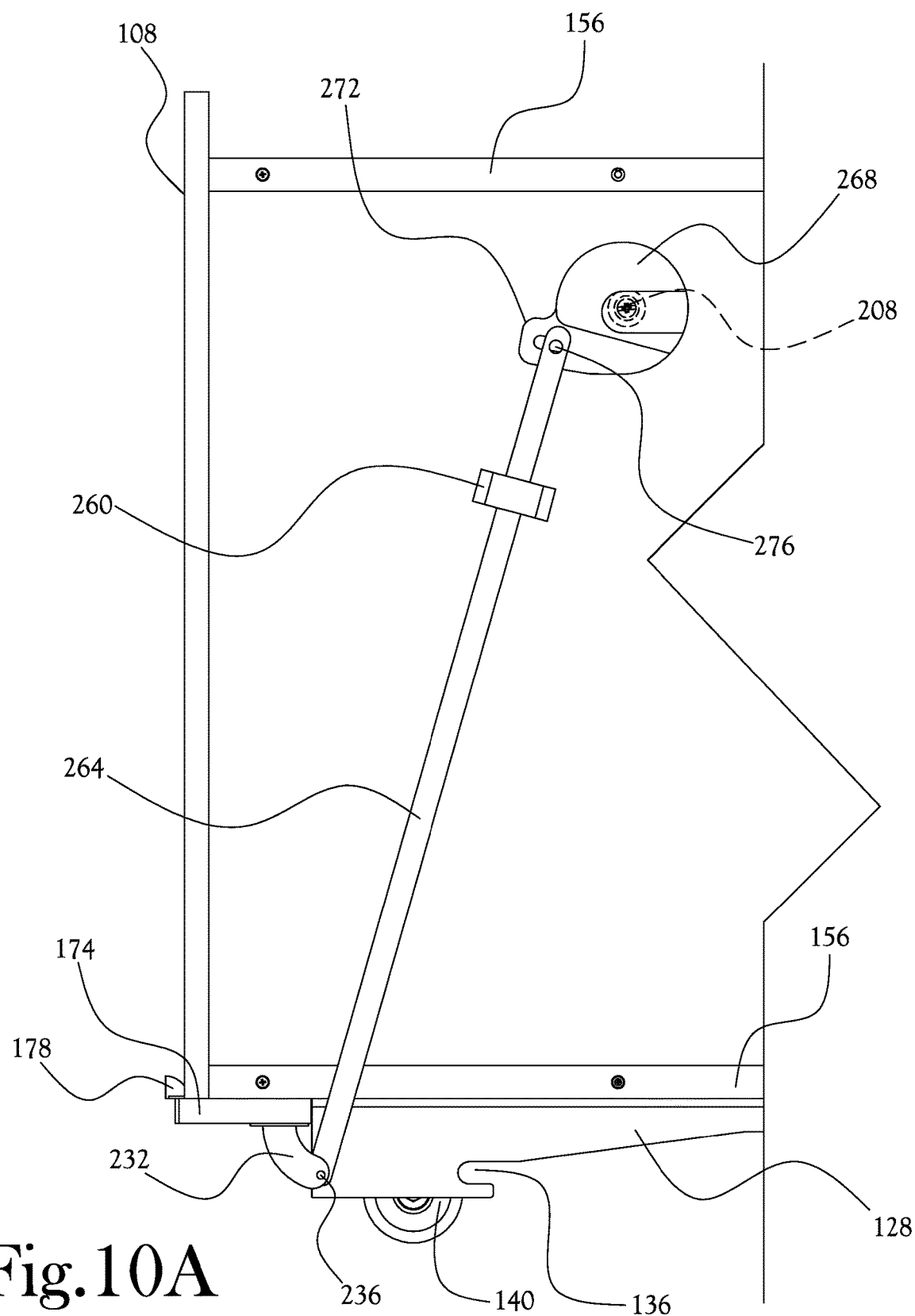
FIGS. 10A-C illustrate securing components configured to secure a cabinet insert in a cabinet shell according to yet another example embodiment of the present general inventive concept.
Figure 10B:
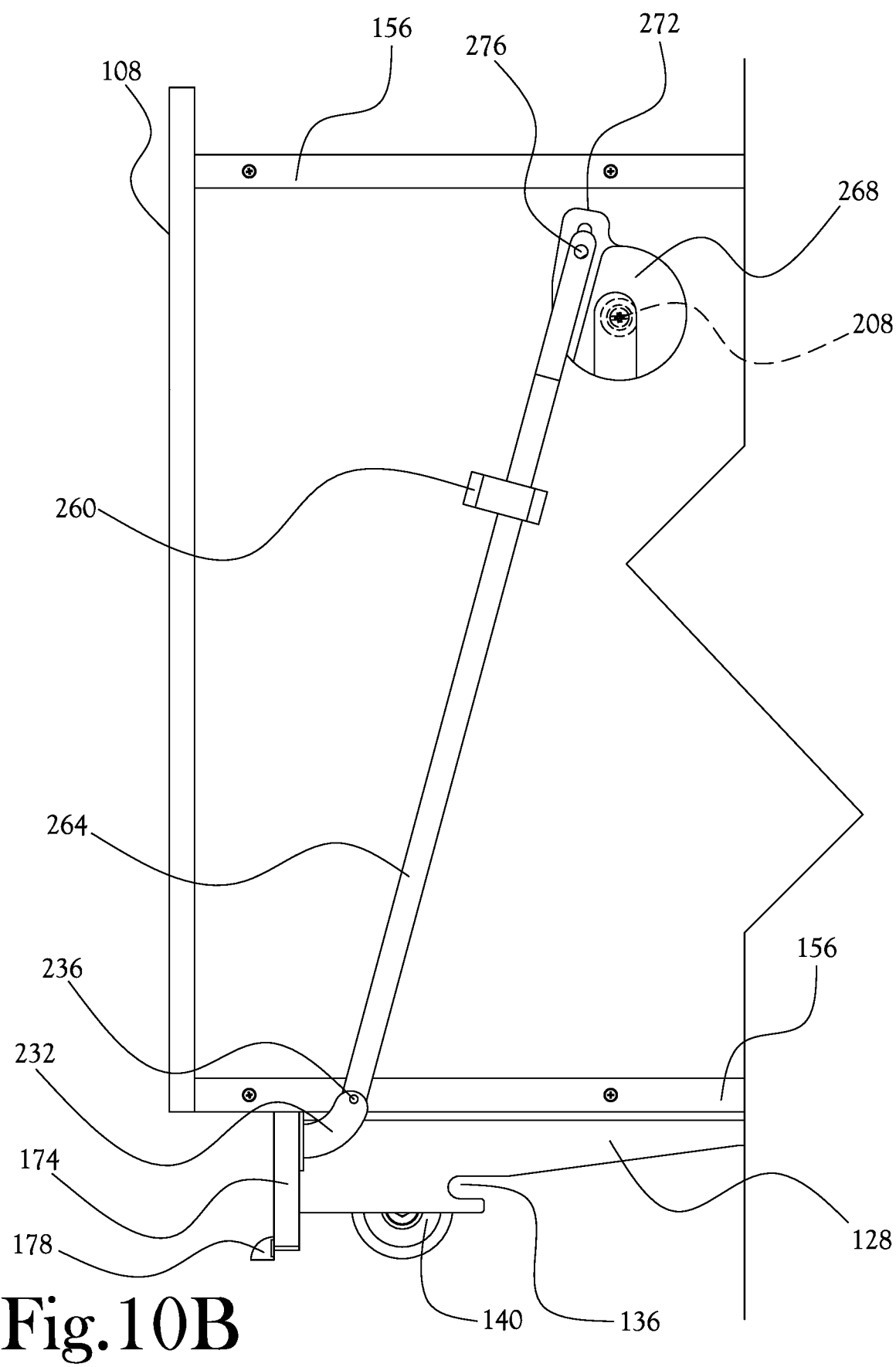
Figure 10C:
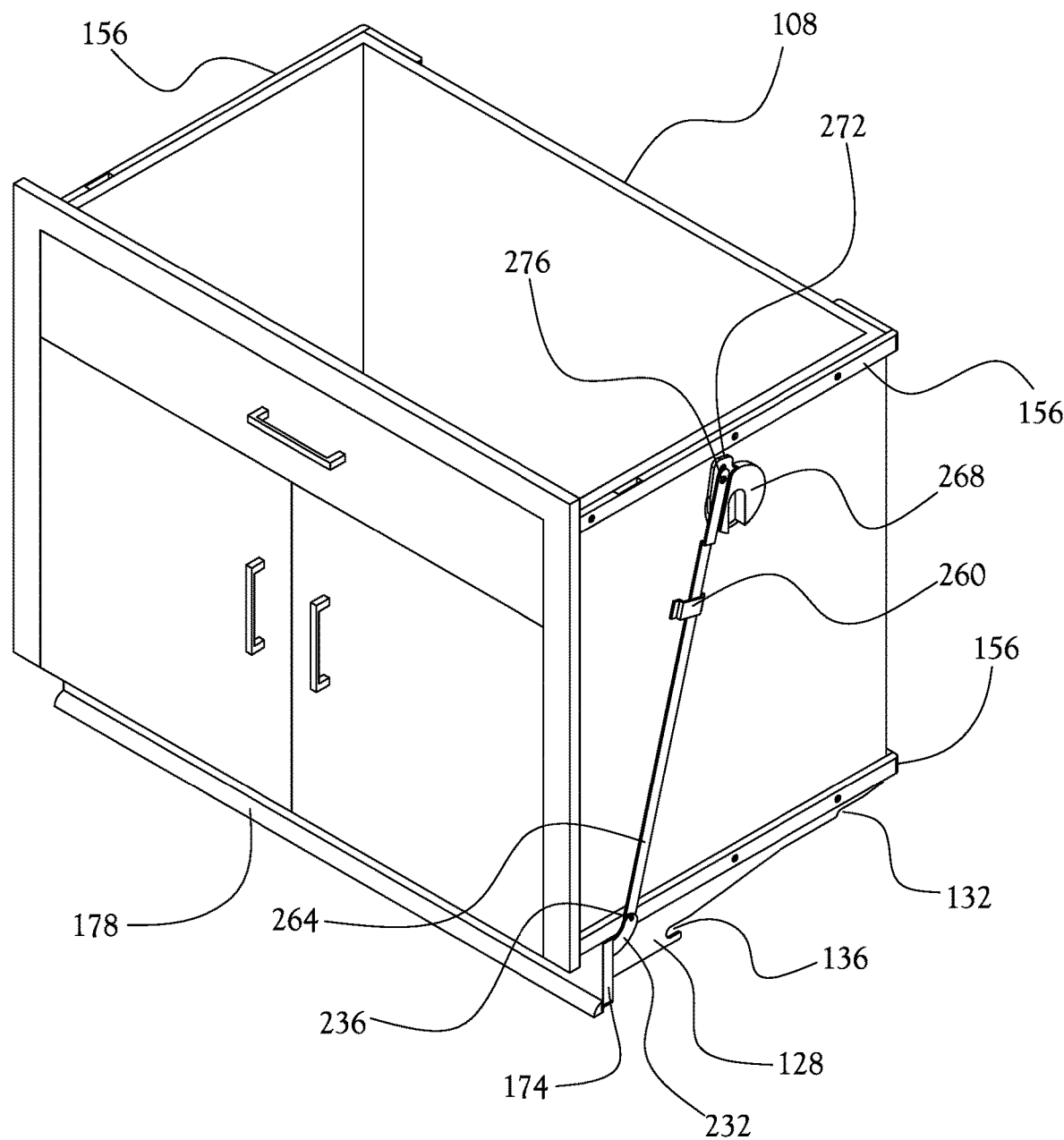

FIGS. 9A-B illustrate securing components configured to secure a cabinet insert in a cabinet shell according to still another example embodiment of the present general inventive concept. In this example embodiment a bar member 248 is coupled to the toe kick panel 174 via the rotating link member 232 in the same fashion as that shown in FIGS. 8A-D, but is not provided with a tab extending through the wall of the cabinet insert 108 to be manipulated by a user. Rather, the extended bar member 248 of this example embodiment is configured to interact with a cam lock 252 that is configured with a protrusion 256 that abuts a top end of the bar member 248 so that a counterclockwise rotation of the cam lock 252 forces the bar member 248 downward to open the toe kick panel 174 via the rotationally linked link member 232. Conversely, pushing the toe kick panel 174 down towards the lowered or closed position pushes the bar member 248, via the link member 232, upward such that the top end of bar member 248 pushes against the protrusion 256 to cause a clockwise rotation of the cam lock 252. The bar member 248 may be guided and maintained in a general up/down orientation of movement by a retaining member such as a guide sleeve 260. Therefore, when the cabinet insert 108 is being moved into the cabinet shell the securing mechanisms may be in the positions shown in FIG. 9A (the cam lock boss 208 is shown in broken line simply to further illustrate the workings of this embodiment), and once the cabinet insert 108 is fully inserted the user can use their foot or other article to push down on the toe kick panel 174, which pushes the bar member 248 to force the cam lock 252 clockwise into a locked position to secure the cabinet insert 108 in the cabinet shell 104 without having to expose and operate the cam lock 252 by hand. To unlock the cabinet insert 108 for removal from the cabinet shell 104, the user can access the cam lock 252 to turn the cam lock 252 counterclockwise, which not only unlocks the cabinet insert 108 but also pushes the bar member 248 down to raise the toe kick panel 174 for clearance during movement of the cabinet insert. In various example embodiments the bar member that actuates the toe kick panel may be linked to the cam lock. For example, FIGS. 10A-C illustrate securing components configured to secure a cabinet insert in a cabinet shell according to yet another example embodiment of the present general inventive concept. In the example embodiment of FIGS. 10A-C, an extended bar member 264 is again arranged to pivot the toe kick panel 174 via the rotationally linked link member 232, but rather than simply abutting a protrusion of a cam lock, a top end of the bar member 264 is coupled to a cam lock 268 via a rotational or pivot connection 276 with a protrusion of the cam lock 268. Thus, while the arrangement of the example embodiment illustrated in FIGS. 9A-B does not allow the cam lock to be rotated in either direction by moving the toe kick panel 178, and vice versa, in the example embodiment of FIGS. 10A-C rotation of either the cam lock 268 or the toe kick panel 174 in either direction causes rotation in the other. Therefore, the toe kick panel 174 can be either raised or lowered by a corresponding rotation of the cam lock 268, and the cam lock 268 can be rotated either clockwise or counterclockwise by lowering or raising the toe kick panel 174. As illustrated in FIG. 10C, the cam lock 268, bar member 264, guide sleeve 260 and link member 232 are arranged so as to not contact or otherwise interfere with the cabinet shell 104 when moving the cabinet insert into the cabinet shell 104.

Figure 11A:
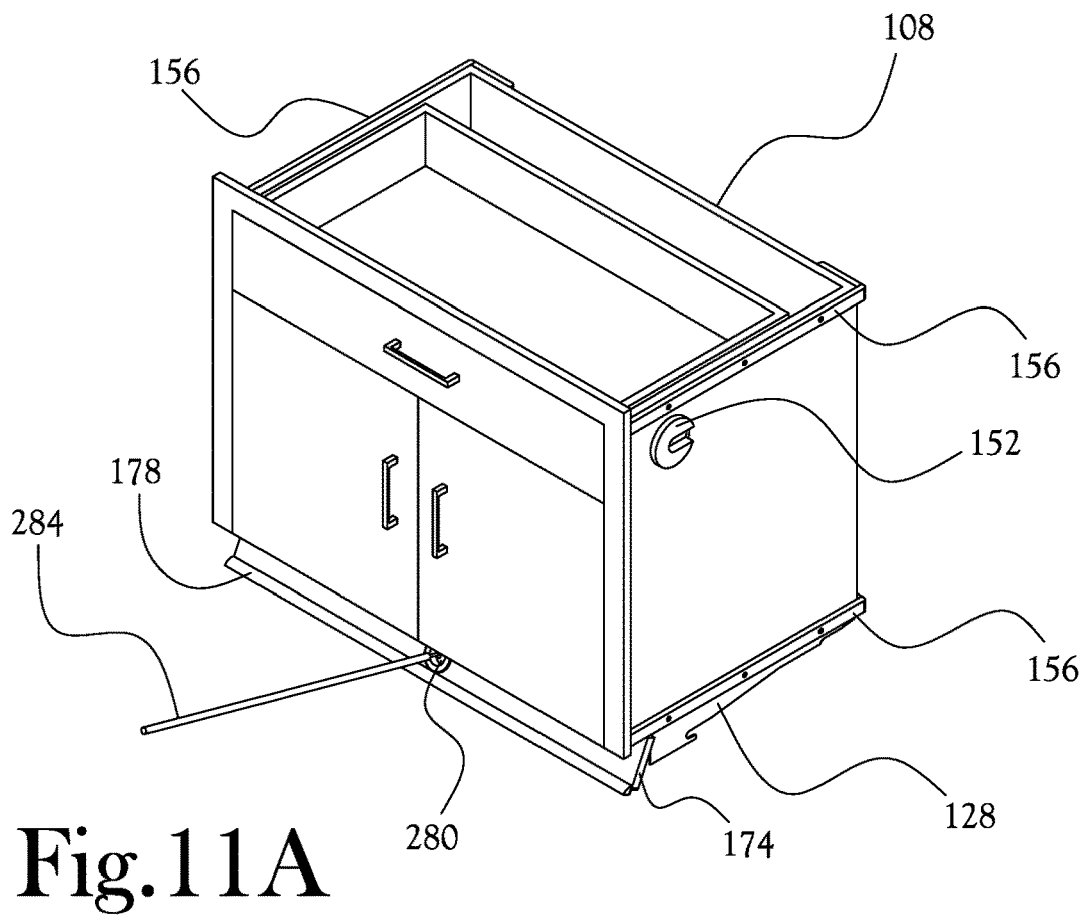
FIGS. 11A-C illustrate a system for raising a toe kick panel of a modular cabinet insert according to an example embodiment of the present general inventive concept.
Figure 11B:
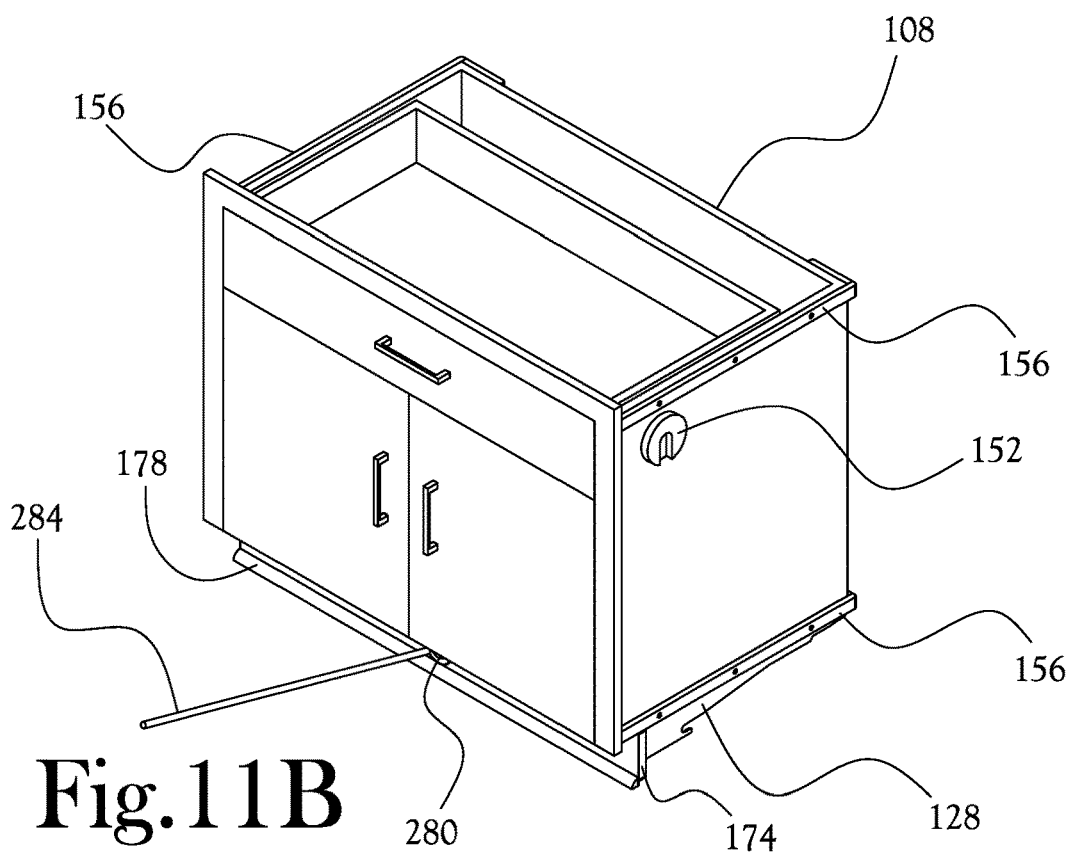
Figure 11C:
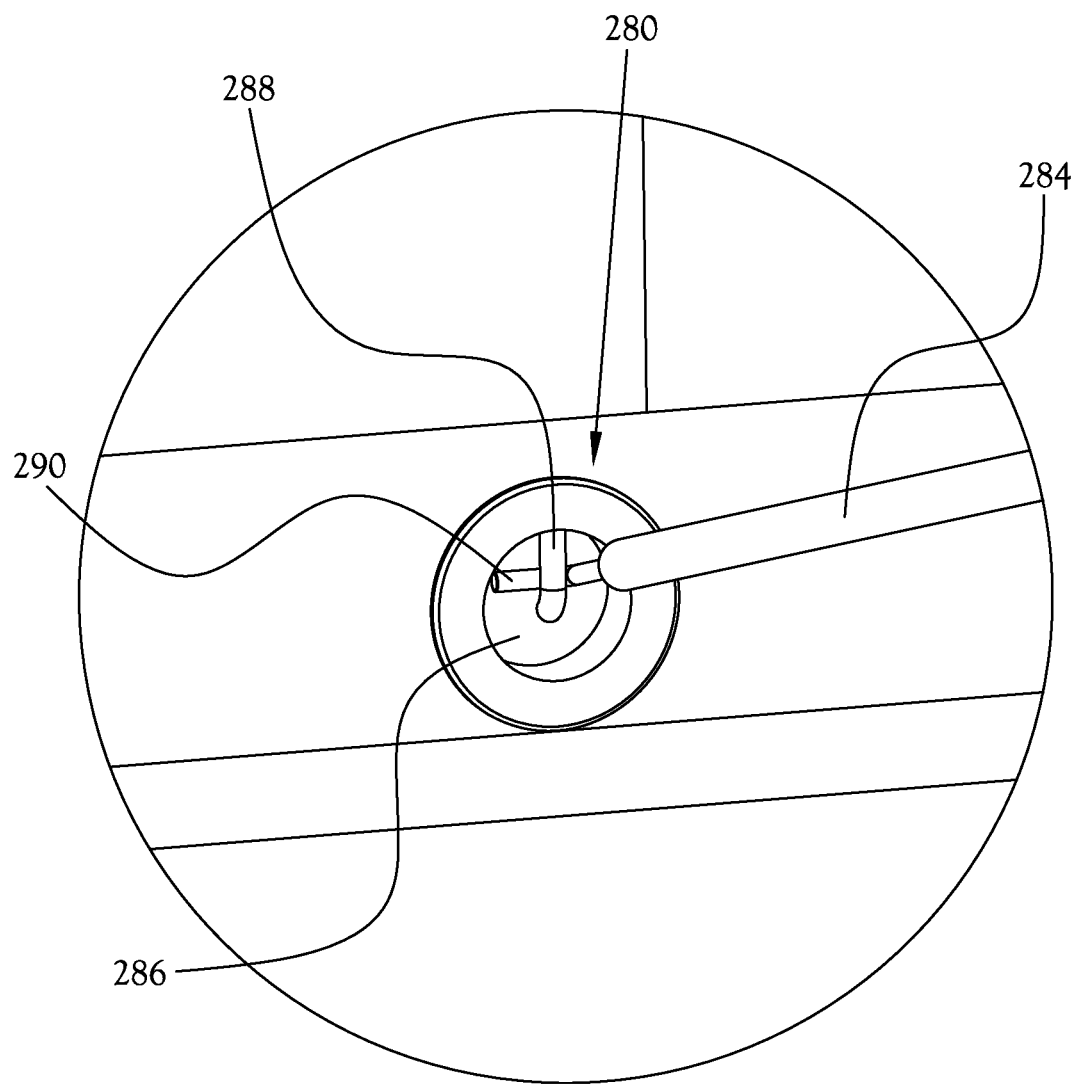

FIGS. 11A-C illustrate a system for raising a toe kick panel of a modular cabinet insert according to an example embodiment of the present general inventive concept. In this example embodiment, the toe kick panel 174 is configured with a hook receiving portion 280 which interacts with a hook tool 284 to raise the toe kick panel 174. As illustrated in more detail in FIG. 11C, a user can manipulate the hook tool 284 so as to place a hook end 292 in a loop 290 that may be arranged in a recess 288 in the front face of the toe kick panel 174, at which point the user can actuate movement of the toe kick panel 174 conveniently from a comfortable location via the long handle of the hook tool 284. As illustrated in FIG. 11A, the hook tool 284 has been coupled to the toe kick panel 174 to raise the toe kick panel 174, and in FIG. 11B the user has allowed the toe kick panel 174 to be lowered back to the vertical position. In various example embodiments the toe kick panel 174 may be coupled to the cabinet insert 108 by freely swinging hinges, and in other various example embodiments the toe kick panel 174 may be coupled by various type of friction hinges to hold the toe kick panel 174 in a position that the user has manipulated the toe kick panel 174 into via the hook tool 184. It is understood that various types of tools and coupling arrangements may be provided to allow a user to pivot the toe kick panel 174 via a hand tool without departing from the scope of the present general inventive concept.

Figure 12A:
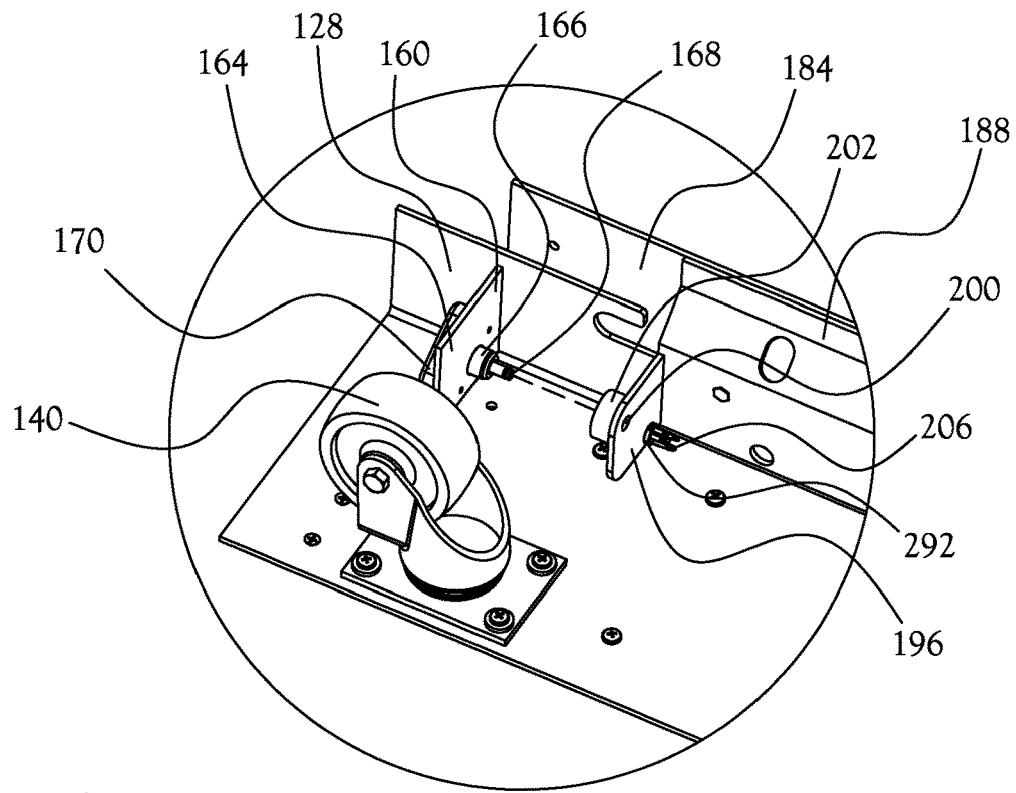
FIGS. 12A-B illustrate the connection of the electrical components of the modular cabinet system illustrated in FIGS. 2A-3E.
Figure 12B:
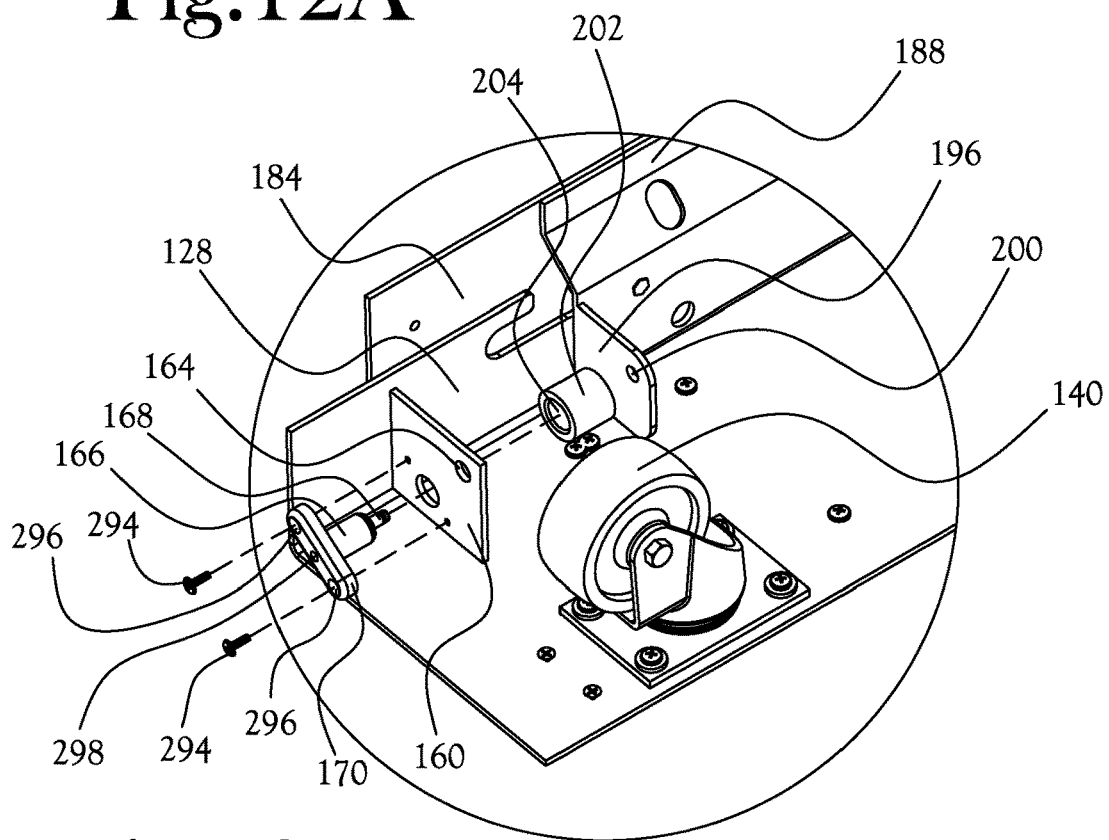

Various types of electric features and controls may be provided to example embodiments of the modular cabinet systems described herein. FIGS. 12A-B illustrate the connection of the electrical components of the modular cabinet system illustrated in FIGS. 2A-3E. FIGS. 12A-B illustrate the arrangement of the various components at a point in which the modular insert 108 is being moved into the cabinet shell 104, with 12B further showing the first electrical connector 166 exploded from the coupling tab 160 of the second slide member 116. The fully connected arrangement of the first and second electrical connectors 166, 202 is illustrated previously in FIGS. 6A-B. As illustrated in FIG. 12A, as the second slide member 116 is moving onto the first slide member 112, the prong 168 of the first electrical connector member 166 moves toward the receiving portion 204 of the second electrical connector member 202 to be received therein to complete the electrical communication connection between the first and second electrical connector members 166, 202. The portion of the first electrical connector member 166 proximate the prong 168 may be tapered leading back from the prong 168, and/or the receiving portion 204 may be tapered outward, in order to facilitate the sliding connection entry of the prong 168 into the receiving portion 204. The second electrical connector member 202 may be configured with a retaining member 292 to secure the second electrical connector member 202 to the coupling tab 196. The securing portion 170 may be configured with a pair of screw holes 296 configured to respectively receive a pair of screws 294 to fix the securing portion 170 to the coupling tab 160, and a connection opening 298 to receive electrical wiring, such as a cord, to transmit electricity received through the electrical connection to the various components of the cabinet insert 108 that may be powered. The electrical leads 206 of the second electrical connector member 202 may be connected to electrical wiring that leads through the back, or some other portion, of the cabinet shell 104 to provide electricity to the second electrical connector member 202. Thus, in various example embodiments the cabinet shell can be wired for optionally provided electrical components in the cabinet insert, whether or not such components are actually included, which increases the convenience and versatility of various example embodiments of the present general inventive concept. Various examples of the types of electrical components that may be provided in the modular cabinet inserts are described herein. It is understood that this is merely one type of electrical connection between the modular cabinet insert and cabinet shell, and a host of other configurations could be employed without departing from the scope of the present general inventive concept.

Figure 13A:
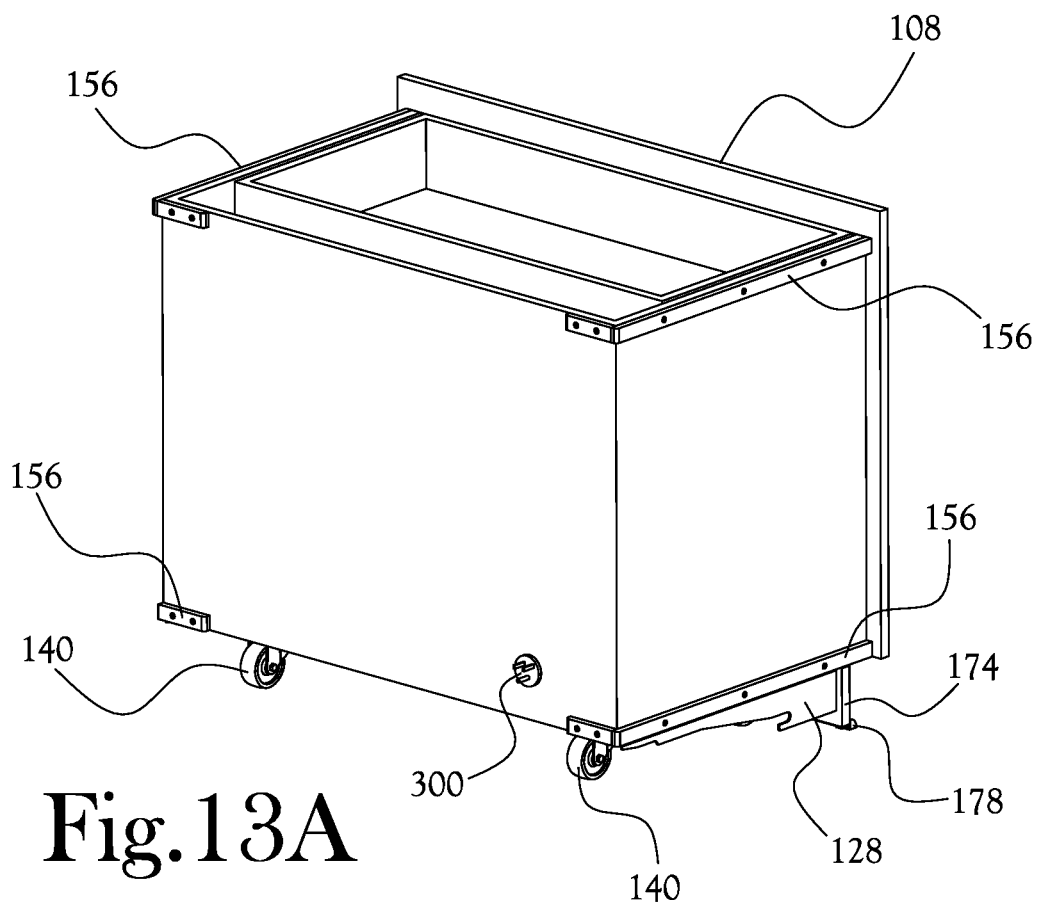
FIGS. 13A-D illustrate a modular cabinet system according to another example embodiment of the present general inventive concept.
Figure 13B:
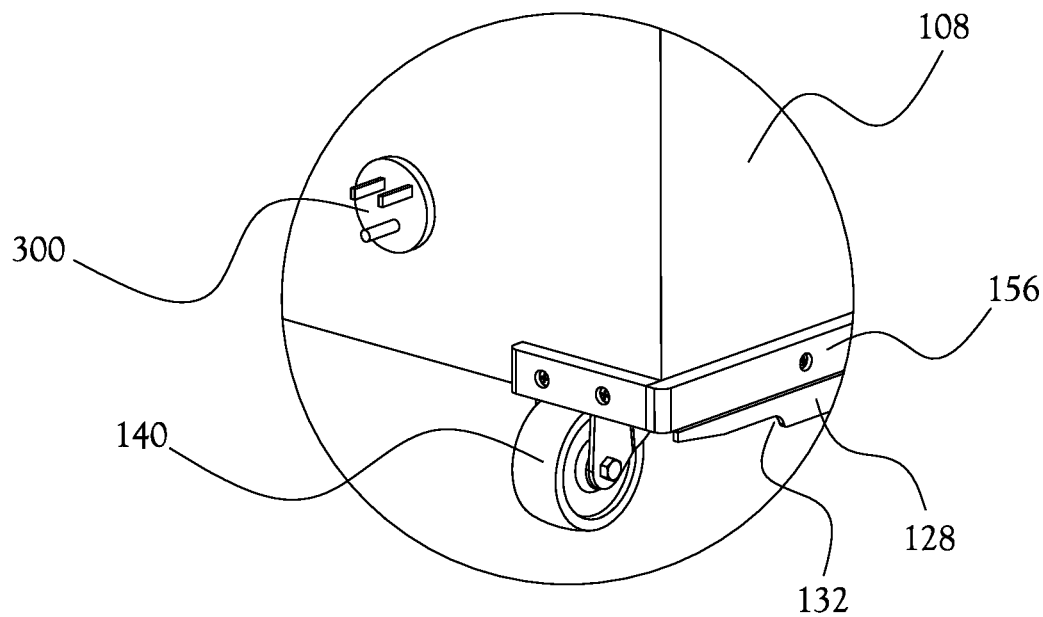
Figure 13C:
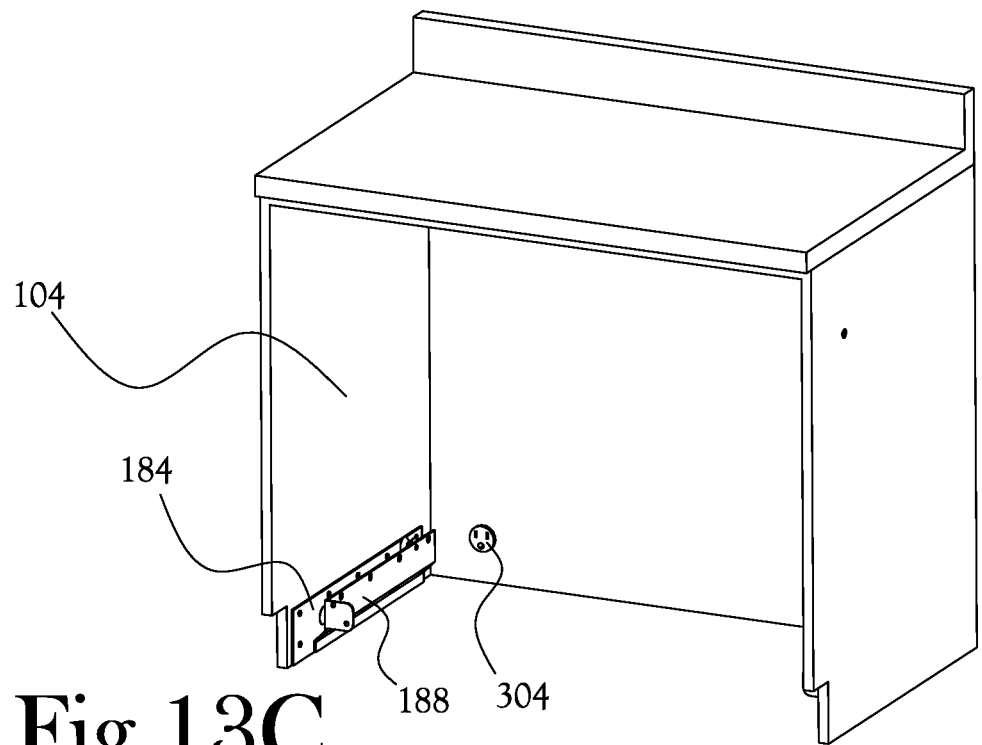
Figure 13D:
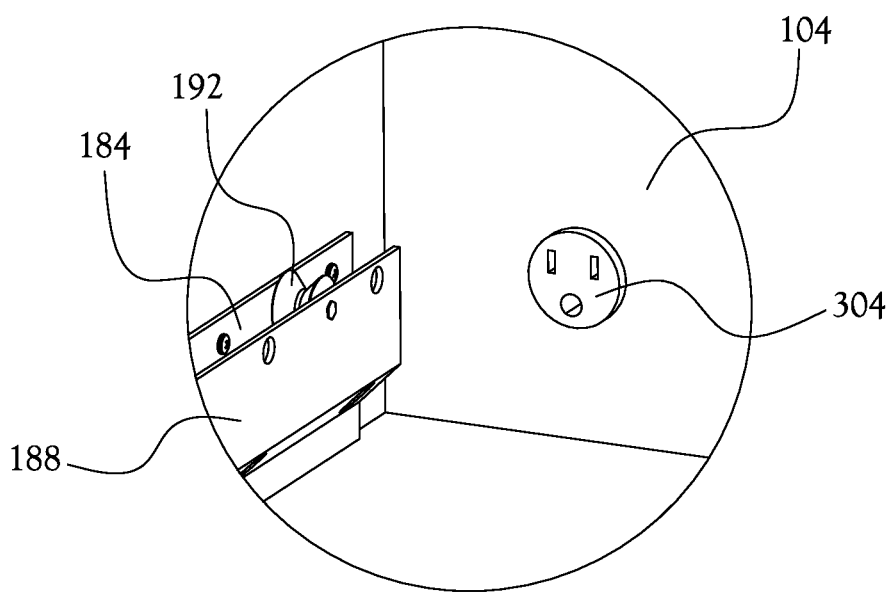

FIGS. 13A-D illustrate a modular cabinet system according to another example embodiment of the present general inventive concept, in which electrical connectors or connections are provided to the cabinet system to provide power to existing and/or future installed electrical components of the cabinet inserts 108. As illustrated in FIGS. 13A-B, an electrical plug 300 has been arranged in a back wall of the cabinet insert 108, and an electrical socket 304 configured to connect to the electrical plug 300 has been arranged in a corresponding position on the back wall of the cabinet shell 104. With such an arrangement the cabinet shell 104 can accept cabinet inserts 108 with or without electrical plugs 300 without interference. Also, cabinet inserts 108 can have onboard components with wired electrical connections that are powered by the electrical plug 300, or the electrical plug 300 can be arranged with connections that may be applied to future installed components. The alignment of the electrical plug 300 and electrical socket 304 allows the electrical connection to be made simply by installing the cabinet insert 108 in the cabinet shell 104 in the same manner as those without electrical connections, as the slide members 112, 116 guide the insert 108, and therefore the electrical plug 300, into the insert 104 and electrical socket 304.

Figure 14:
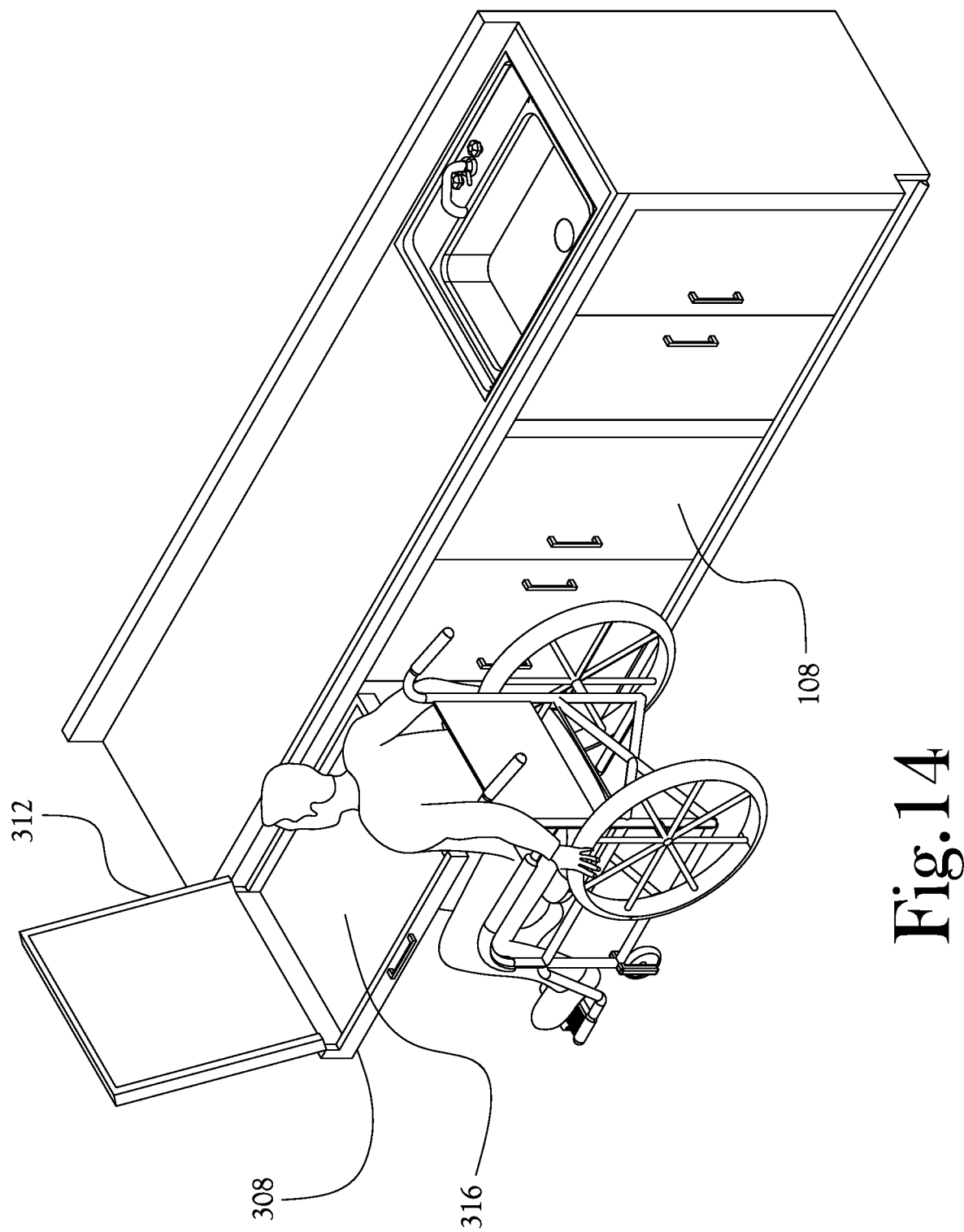
FIG. 14 illustrates a modular cabinet insert according to an example embodiment of the present general inventive concept.

Such a modular system allows easy installation of cabinetry that may be required, or at least desired, for disabled persons using the residence. For example, some or all of the cabinet inserts may include top "drawer" pull outs configured to provide work surfaces which can be easily accessed and used by persons in wheelchairs, etc. FIG. 14 illustrates a modular cabinet insert according to an example embodiment of the present general inventive concept, wherein a convertible drawer 308 is provided in a cabinet insert 106 to provide a convenient work space that a person using a wheelchair can maneuver the wheelchair in under to perform food preparation or other such activities. The convertible drawer 308 operates in much the same manner as other drawers, and in this example embodiment is provided with a hinged pivoting top 312 that may be raised to expose a storage space 316 underneath, so that a user can store items that may typically be used on the work space. In other example embodiments the pull out work space may be a solid block, or a hollow block that does not open, and so on. The pivoting top 312 may be equipped with a rotating stand member to allow a user to prop the pivoting top 312 up. In various example embodiments the pivoting top 312 may be configured with a reversible motor and drive, such as described herein, to allow the user to simply press a button to cause the hinged top 72 to be raised and lowered.

Figure 15A:
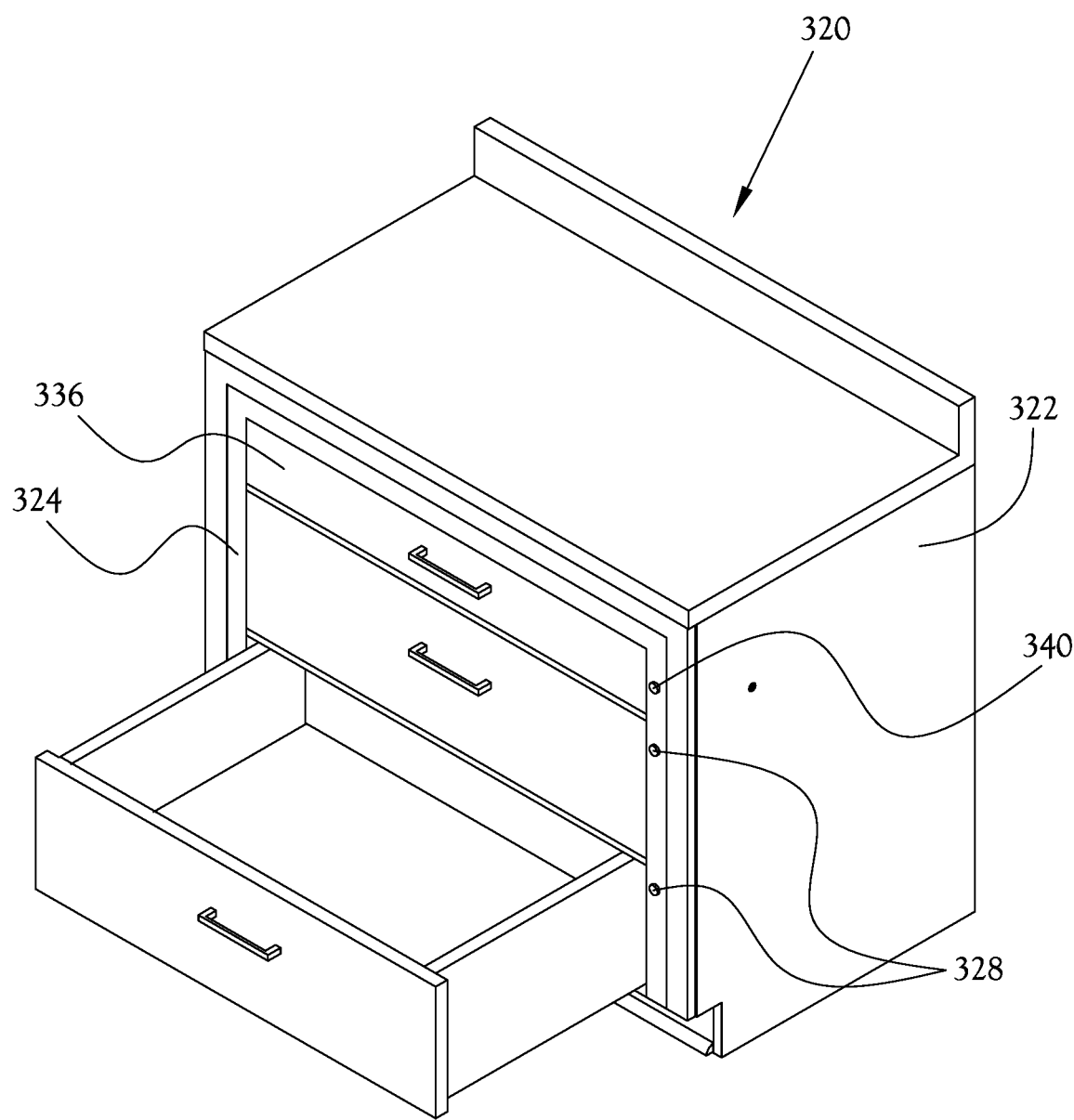
FIGS. 15A-B illustrate a modular cabinet insert according to another example embodiment of the present general inventive concept.
Figure 15B:
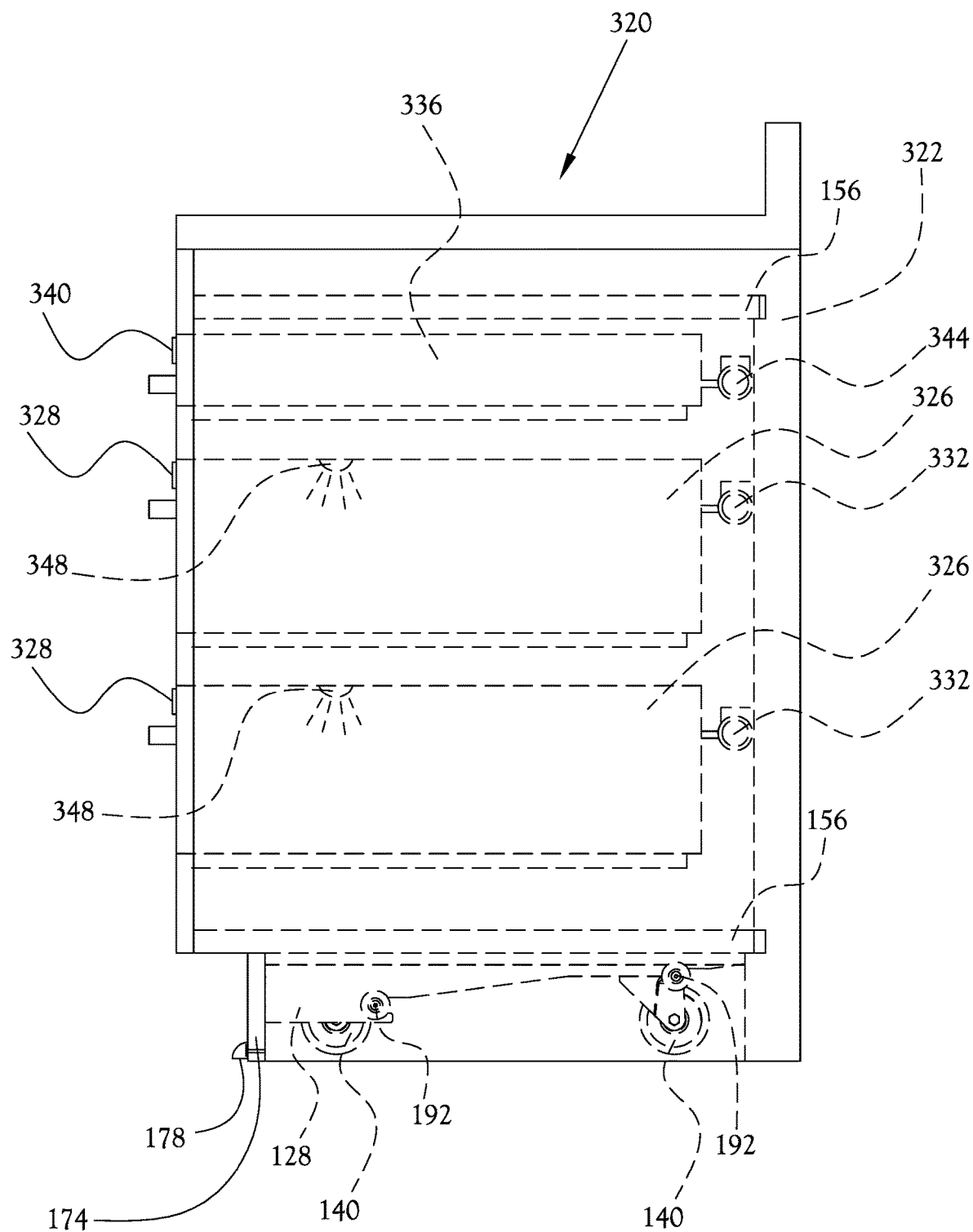

As previously described, various type of electrical components such as, for example, lights, drive motors, etc., may be provided as desired in the cabinet inserts. FIGS. 15A-B illustrate a modular cabinet system according to another example embodiment of the present general inventive concept.

Various example embodiments of the cabinet inserts may include drawer or doors or combinations thereof. Some or all of the cabinet inserts 108 may be configured for powered opening and closing of the drawers or other extendable features arranged therein. As illustrated in FIGS. 15A-B, an example modular cabinet system 320 may include a cabinet shell 322 and a cabinet insert 324 that may be configured with a plurality of drawers 326 that each have an activation button 328 to cause the drawers 326 to selectively slide in and out on drawer runners/slides. Each drawer 326 may have a reversible driving motor 332 to slide the drawer 326. Thus, a user can press the activation button 328 to cause the corresponding drawer 326 to slide out, and can press the activation button 328 again to cause the drawer 326 to slide back in. Various example embodiments may be provided with full extension undermount drawer slides that allow the drawers 326 to open fully, increasing the user's convenience. A work surface pull out 336 is provided proximate the top of the cabinet insert 324, and is also provided with a corresponding activation button 340 and reversible driving motor 344. The work surface pull out 336 works in the same manner as the drawers 326, and allows a work surface for a user that may have trouble standing to work on a counter surface. In various example embodiments the work surface pull out 336 may be configured as the convertible drawer 308 illustrated in FIG. 14. One or more lights 348 may also be arranged in or over corresponding drawers to be lit, or on the bottom of shelves, etc. Although the cabinet insert 324 is illustrated with two drawers 326 and a pull out work surface 340, various example embodiments of the present general inventive concept may provide a host of different quantities or combinations of these features. Similarly, the locations and configurations of various features such as the activation buttons and or graphical user interface, reversible motors, linkages, etc., may vary in different example embodiments without departing from the scope of the present general inventive concept. In various example embodiments a plurality of drawers may be concealed behind doors of a cabinet insert when the doors are closed. Opening one of the doors may expose a plurality of drawers that each have a corresponding activation button which will cause a reversible motor to move the respective drawers in and out. In various example embodiments the toe kick panel may be provided with an electrically actuated opening arrangement, such as a linear actuator member that controls the raising and lowering of the toe kick panel. Such componentry may be conveniently powered by the electrical connector members 166, 202 illustrated in FIGS. 12A-B, or electrical plug 300 and electrical socket connection 304 illustrated in FIGS. 13A-D, or other various example embodiments of the present general inventive concept, and may further include wireless communication units (not shown) to allow the various electric components to be controlled through "smart controls," remotely located controls, and so on. Also, various example embodiments may be configured to be in communication with home control device hubs which allow voice commands to control the various electrical components included in the cabinet inserts.

Various example embodiments of the present general inventive concept may provide various forms of smart controls for the modular cabinet system, which may provide secondary controls for the modular cabinets and/or other features. Such an example embodiment may let the operator actuate the powered features provided to individual cabinets via wireless connectivity through an application on an information processing device such as a smartphone, tablet, etc., and/or with a centralized touchscreen interface controlling all of the cabinets. In various example embodiments such power-able features may include locking/unlocking of the modular insert in the shell structure, actuation of doors and/or drawers, locking of doors and/or drawers, extending/retracting shelving, a powered appliance lift, controlling lighting in the cabinets, etc., or any combination of such features. Such smart control features may be optional in the various example embodiments of the present general inventive concept, and any and all such powered features may also be controlled by a hardwired dedicated interface accessible from, for example, the front side of each cabinet. In example embodiments in which only local (proximate) control of the cabinets may be desired, the cabinets may be connected together via short-range wireless technology such as BLUETOOTH®. Each cabinet may have an individual BLUETOOTH® module, and one of the cabinets (or a separate master device) may act as the BLUETOOTH® hub. This would enable controlling a certain function of several cabinets at the same time. Such a configuration would be useful, for example, for turning the lighting on/off on all cabinets simultaneously, etc. Remote (distant) control of the cabinets may be achieved by adding a master Wi-Fi module to a cabinet (or by adding a separate master device) that also acts as the BLUETOOTH® hub. This "master" device may receive input over the local Wi-Fi network and relay the output to the cabinets via BLUETOOTH® or an equivalent wireless method. The apps on smartphones/tablets may be, for example, Android/iOS apps, open source home automation software like Home Assistant, or the like. The latter may work with a dedicated PC, which could also be used as the Wi-Fi/BLUETOOTH® hub. In such example embodiments as these described above, the two-way data transfer may be established to allow remote monitoring of actuator or lock status, to monitor whether a drawer or door has been opened, etc., which could be particularly useful for monitoring things such as, for example, medication access in an assisted living environment.

Various example embodiments of the present general inventive concept may provide a modular cabinet system, the system including a cabinet shell configured with an open front space, a cabinet insert configured to be selectively installed in, and removed from, the cabinet shell by being passed through the open front space, a pair of first slide members respectively provided to each inner side surface of the cabinet shell, and a pair of second slide members respectively provided to each outer side surfaces provided proximate each side of the cabinet insert, wherein the respective first slide members are configured to interact with the corresponding second slide members to guide the cabinet insert into, and out of, the cabinet shell. The system may further include a plurality of wheels provided to a bottom of the cabinet insert such that the cabinet insert can be rolled to a desired location. The first and second slide members may be configured to lift the cabinet insert during installation such that the wheels of the cabinet insert do not support the cabinet insert when fully installed. Each of the second slide members may include a guide rail portion, and each of the first slide members may include a plurality of rollers configured to support the guide rail portion of the corresponding second slide members thereon. A rearmost one of the rollers may be configured to be higher than a frontmost one of the rollers on each of the first slide members, and a bottom of the guide rail portion of each of the second slide members may be configured to be angled upward from front to back, such that the guide rail portion can be supported by the rearmost and frontmost rollers so as to raise the cabinet insert when installed. The bottom of the guide rail portion of each of the second slide members may be configured with a plurality of notches to respectively receive the rollers of the corresponding first slide members when the cabinet insert is fully installed. The cabinet insert may include a toe kick panel configured to be rotatably coupled proximate a top end thereof to a bottom of the cabinet insert such that a bottom of the toe kick panel is rotatable to and from a raised forward position. The cabinet insert may further include one or more push latches attached proximate a bottom surface of the cabinet insert and configured to push against the toe kick panel to rotate the toe kick panel forward when in an open extended position, and to allow the toe kick panel to be positioned substantially vertically when in a closed withdrawn position. The system may further include a plurality of friction hinges configured to rotatably couple the toe kick panel to the bottom of the cabinet insert such that the toe kick panel will maintain a selected position without an external force being applied. A front face of the toe kick panel may be configured with a receiving portion configured to receive a hook member to raise and lower the toe kick panel to the selected position. The system may further include a bar member provided proximate a side wall of the cabinet insert and configured with a top and bottom end, and a link member having a first end rotationally coupled proximate the bottom end of the bar member, and a second end connected to a back surface of the toe kick panel, wherein the bar member and link member may be configured such that moving the bar member in a first direction applies a push force to rotate the toe kick panel to a raised position, and moving the bar member in a second direction opposite the first direction applies a pull force to rotate the toe kick panel back to a lowered position. The bar member may be configured with a tab proximate the top end of the bar member, the tab extending through a slot formed in the side wall such that the bar member can be moved to actuate the toe kick panel when the cabinet insert is installed in the cabinet shell. The system may further include a cam lock boss attached to an inner surface of a side wall of the cabinet shell, and a cam lock arranged in a the side wall of the cabinet insert proximate the bar member and configured with a slot to receive the cam lock boss and to be rotatable to secure the cabinet insert in place when the cabinet insert is installed in the cabinet shell, wherein a portion of the cam lock may contact the top end of the bar member such that rotation of the cam lock moves the bar member to actuate movement of the toe kick panel. The system may further include a shoe molding strip being coupled proximate a bottom of the toe kick panel and configured to be selectively positionable relative to the bottom of the toe kick panel. The system may further include a cam lock boss attached to an inner surface of a side wall of the cabinet shell, and a cam lock arranged in a the side wall of the cabinet insert proximate the bar member and configured with a slot to receive the cam lock boss and to be rotatable to secure the cabinet insert in place when the cabinet insert is installed in the cabinet shell. The system may further include a first tab member connected to at least one of the first slide members and configured with a first opening, a second tab member connected to at least one of second slide members and configured with a second opening; and a threaded bolt member with a handle on one end and configured to be passed through the first and second openings formed in the first and second tab members, wherein the first and second tab members may be proximate one another, and the first and second openings may be aligned, when the cabinet insert is fully installed such that the threaded bolt member is passable through the first and second openings to secure the cabinet insert in place. The first and second tab members may be arranged to be proximate a back surface of a pivotable toe kick panel when the cabinet insert is fully installed so as to be accessible by raising the toe kick panel.

Various example embodiments of the present general inventive concept may provide a system to allow a modular cabinet insert to be selectively installed in and removed from a cabinet shell, the system including a pair of first slide members configured to be connected to a cabinet shell having an open front space, and a pair of second slide members configured to be connected to a modular cabinet insert configured to pass through the open front space of the cabinet shell, wherein the respective first slide members are configured to interact with the corresponding second slide members to guide the modular cabinet insert into, and out of, the cabinet shell through the open front space. The first slide members may be configured to be respectively attached to each inner side surface of the cabinet shell, and the second slide members may be configured to be respectively attached to each outer side surface of the modular cabinet insert. The system may further include a first fixing member configured to be attached to the cabinet shell, and a second fixing member configured to be respectively attached to the modular cabinet insert, wherein the first and second fixing members may be configured to be proximate one another when the modular cabinet insert is fully installed in the cabinet shell, and wherein the first and second fixing members may be configured to be coupled together to secure the modular cabinet insert in place when the modular cabinet insert is fully installed in the cabinet shell.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

It is noted that the simplified diagrams and drawings included in the present application do not illustrate all the various connections and assemblies of the various components, however, those skilled in the art will understand how to implement such connections and assemblies, based on the illustrated components, figures, and descriptions provided herein, using sound engineering judgment. Numerous variations, modification, and additional embodiments are possible, and, accordingly, all such variations, modifications, and embodiments are to be regarded as being within the spirit and scope of the present general inventive concept.

While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

The invention claimed is:

1. A modular cabinet system, the system comprising:
   a cabinet shell configured with an open front space;
   a cabinet insert configured to be selectively installed in, and removed from, the cabinet shell by being passed through the open front space;
   a pair of first slide members respectively provided to each inner side surface of the cabinet shell; and
   a pair of second slide members respectively provided to each outer side surfaces provided proximate each side of the cabinet insert;
   wherein the respective first slide members are configured to interact with the corresponding second slide members to guide the cabinet insert into, and out of, the cabinet shell, and
   wherein the cabinet insert comprises a toe kick panel configured to be rotatably coupled proximate a top end thereof to a bottom of the cabinet insert such that a bottom of the toe kick panel is rotatable to and from a raised forward position.

2. The system of claim 1, further comprising a plurality of wheels provided to a bottom of the cabinet insert such that the cabinet insert can be rolled to a desired location.

3. The system of claim 2, wherein the first and second slide members are configured to lift the cabinet insert during installation such that the wheels of the cabinet insert do not support the cabinet insert when fully installed.

4. The system of claim 3, wherein each of the second slide members comprises a guide rail portion; and
   each of the first slide members comprises a plurality of rollers configured to support the guide rail portion of the corresponding second slide members thereon.

5. The system of claim 4, wherein a rearmost one of the rollers is configured to be higher than a frontmost one of the rollers on each of the first slide members, and a bottom of the guide rail portion of each of the second slide members is configured to be angled upward from front to back, such that the guide rail portion can be supported by the rearmost and frontmost rollers so as to raise the cabinet insert when installed.

6. The system of claim 5, wherein the bottom of the guide rail portion of each of the second slide members is configured with a plurality of notches to respectively receive the rollers of the corresponding first slide members when the cabinet insert is fully installed.

7. The system of claim 1, wherein the cabinet insert further comprises one or more push latches attached proximate a bottom surface of the cabinet insert and configured to push against the toe kick panel to rotate the toe kick panel forward when in an open extended position, and to allow the toe kick panel to be positioned substantially vertically when in a closed withdrawn position.

8. The system of claim 1, further comprising a plurality of friction hinges configured to rotatably couple the toe kick panel to the bottom of the cabinet insert such that the toe kick panel will maintain a selected position without an external force being applied.

9. The system of claim 8, wherein a front face of the toe kick panel is configured with a receiving portion configured to receive a hook member to raise and lower the toe kick panel to the selected position.

10. The system of claim 1, further comprising:
    a bar member provided proximate a side wall of the cabinet insert and configured with a top and bottom end; and
    a link member having a first end rotationally coupled proximate the bottom end of the bar member, and a second end connected to a back surface of the toe kick panel;
    wherein the bar member and link member are configured such that moving the bar member in a first direction applies a push force to rotate the toe kick panel to a raised position, and moving the bar member in a second direction opposite the first direction applies a pull force to rotate the toe kick panel back to a lowered position.

11. The system of claim 10, wherein the bar member is configured with a tab proximate the top end of the bar member, the tab extending through a slot formed in the side wall such that the bar member can be moved to actuate the toe kick panel when the cabinet insert is installed in the cabinet shell.

12. The system of claim 10, further comprising:
    a cam lock boss attached to an inner surface of a side wall of the cabinet shell; and
    a cam lock arranged in a the side wall of the cabinet insert proximate the bar member and configured with a slot to receive the cam lock boss and to be rotatable to secure the cabinet insert in place when the cabinet insert is installed in the cabinet shell;
    wherein a portion of the cam lock contacts the top end of the bar member such that rotation of the cam lock moves the bar member to actuate movement of the toe kick panel.

13. The system of claim 1, further comprising a shoe molding strip being coupled proximate a bottom of the toe kick panel and configured to be selectively positionable relative to the bottom of the toe kick panel.

14. The system of claim 1, further comprising:
    a cam lock boss attached to an inner surface of a side wall of the cabinet shell; and
    a cam lock arranged in a the side wall of the cabinet insert proximate the bar member and configured with a slot to receive the cam lock boss and to be rotatable to secure the cabinet insert in place when the cabinet insert is installed in the cabinet shell.

15. The system of claim 1, further comprising:
    a first tab member connected to at least one of the first slide members and configured with a first opening;
    a second tab member connected to at least one of second slide members and configured with a second opening; and
    a threaded bolt member with a handle on one end and configured to be passed through the first and second openings formed in the first and second tab members;

wherein the first and second tab members are proximate one another, and the first and second openings are aligned, when the cabinet insert is fully installed such that the threaded bolt member is passable through the first and second openings to secure the cabinet insert in place.

16. The system of claim 15, wherein the first and second tab members are arranged to be proximate a back surface of the toe kick panel when the cabinet insert is fully installed so as to be accessible by raising the toe kick panel.

17. A modular cabinet system, the system comprising:
a cabinet shell configured with an open front space;
a cabinet insert configured to be selectively installed in, and removed from, the cabinet shell by being passed through the open front space;
a pair of first slide members respectively provided to each inner side surface of the cabinet shell;
a pair of second slide members respectively provided to each outer side surfaces provided proximate each side of the cabinet insert; and
a plurality of wheels provided to a bottom of the cabinet insert such that the cabinet insert can be rolled to a desired location;
wherein the respective first slide members are configured to interact with the corresponding second slide members to guide the cabinet insert into, and out of, the cabinet shell,
wherein the first and second slide members are configured to lift the cabinet insert during installation such that the wheels of the cabinet insert do not support the cabinet insert when fully installed,
wherein each of the second slide members comprises a guide rail portion, and each of the first slide members comprises a plurality of rollers configured to support the guide rail portion of the corresponding second slide members thereon, and
wherein a rearmost one of the rollers is configured to be higher than a frontmost one of the rollers on each of the first slide members, and a bottom of the guide rail portion of each of the second slide members is configured to be angled upward from front to back, such that the guide rail portion can be supported by the rearmost and frontmost rollers so as to raise the cabinet insert when installed.

18. A modular cabinet system, the system comprising:
a cabinet shell configured with an open front space;
a cabinet insert configured to be selectively installed in, and removed from, the cabinet shell by being passed through the open front space;
a pair of first slide members respectively provided to each inner side surface of the cabinet shell;
a pair of second slide members respectively provided to each outer side surfaces provided proximate each side of the cabinet insert;
a cam lock boss attached to an inner surface of a side wall of the cabinet shell; and
a cam lock arranged in a the side wall of the cabinet insert proximate the bar member and configured with a slot to receive the cam lock boss and to be rotatable to secure the cabinet insert in place when the cabinet insert is installed in the cabinet shell;
wherein the respective first slide members are configured to interact with the corresponding second slide members to guide the cabinet insert into, and out of, the cabinet shell.

19. A modular cabinet system, the system comprising:
a cabinet shell configured with an open front space;
a cabinet insert configured to be selectively installed in, and removed from, the cabinet shell by being passed through the open front space;
a pair of first slide members respectively provided to each inner side surface of the cabinet shell;
a pair of second slide members respectively provided to each outer side surfaces provided proximate each side of the cabinet insert;
a first tab member connected to at least one of the first slide members and configured with a first opening;
a second tab member connected to at least one of second slide members and configured with a second opening; and
a threaded bolt member with a handle on one end and configured to be passed through the first and second openings formed in the first and second tab members;
wherein the first and second tab members are proximate one another, and the first and second openings are aligned, when the cabinet insert is fully installed such that the threaded bolt member is passable through the first and second openings to secure the cabinet insert in place,
wherein the first and second tab members are arranged to be proximate a back surface of a pivotable toe kick panel when the cabinet insert is fully installed so as to be accessible by raising the toe kick panel, and
wherein the respective first slide members are configured to interact with the corresponding second slide members to guide the cabinet insert into, and out of, the cabinet shell.

* * * * *